United States Patent
Mallik et al.

(10) Patent No.: US 10,098,140 B2
(45) Date of Patent: Oct. 9, 2018

(54) CHANNEL RESERVATION TECHNIQUES FOR UNLICENSED SPECTRUM

(71) Applicant: QUALCOMM Incorporated, San Diego, CA (US)

(72) Inventors: Siddhartha Mallik, San Diego, CA (US); Aleksandar Damnjanovic, Del Mar, CA (US); Jing Sun, San Diego, CA (US); Taesang Yoo, Riverside, CA (US); Xiaoxia Zhang, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 15/154,344

(22) Filed: May 13, 2016

(65) Prior Publication Data
US 2017/0215200 A1 Jul. 27, 2017

Related U.S. Application Data

(60) Provisional application No. 62/287,604, filed on Jan. 27, 2016.

(51) Int. Cl.
*H04W 72/12* (2009.01)
*H04L 5/00* (2006.01)
(Continued)

(52) U.S. Cl.
CPC ...... *H04W 72/1268* (2013.01); *H04B 7/0626* (2013.01); *H04L 5/0048* (2013.01);
(Continued)

(58) Field of Classification Search
CPC .... H04B 7/0626; H04L 5/0048; H04W 52/00; H04W 72/0493; H04W 72/082;
(Continued)

(56) References Cited

U.S. PATENT DOCUMENTS

2009/0097443 A1* 4/2009 Pasanen ............... H04W 72/04
370/329
2009/0196250 A1* 8/2009 Feng ..................... H04W 24/10
370/330

(Continued)

FOREIGN PATENT DOCUMENTS

WO    WO-2016006984 A1    1/2016

OTHER PUBLICATIONS

ISA/EP, International Search Report and Written Opinion of the International Searching Authority, Int'l Application No. PCT/US2016/064440, dated Mar. 6, 2017, European Patent Office, Rijswijk, NL, 11 pgs.

*Primary Examiner* — Rina C Pancholi
(74) *Attorney, Agent, or Firm* — Holland & Hart LLP

(57) ABSTRACT

Methods, systems, and devices for wireless communication are described. A base station may identify a transmission opportunity duration and an allocation for downlink and uplink transmissions, then broadcast a channel reservation request transmission. The broadcast may be sent using unlicensed radio frequency spectrum over a channel that includes multiple-sub-bands. The channel reservation transmission may include the identified duration, allocation, and a channel state information (CSI) request. User equipments (UEs) may receive the broadcast, and respond with a channel reservation response transmission that includes a CSI report, a transmit identity, or an interference threshold indicator. In some cases, some or all of the UEs may transmit a sounding reference signal (SRS) in response to an SRS request that is broadcast by the base station. The base station may schedule uplink and/or downlink transmissions to at least a subset of the multiple UEs based on the channel reservation response and/or SRS.

26 Claims, 20 Drawing Sheets

(51) Int. Cl.
  *H04W 72/04* (2009.01)
  *H04B 7/06* (2006.01)
  *H04W 72/08* (2009.01)
  *H04W 52/00* (2009.01)
  *H04W 74/08* (2009.01)
(52) U.S. Cl.
  CPC ....... *H04W 52/00* (2013.01); *H04W 72/0493* (2013.01); *H04W 72/082* (2013.01); *H04W 72/1273* (2013.01); *H04W 74/0808* (2013.01); *H04W 72/0446* (2013.01)
(58) Field of Classification Search
  CPC ......... H04W 72/1268; H04W 72/1273; H04W 72/0446; H04W 74/0808
  See application file for complete search history.

(56) References Cited

U.S. PATENT DOCUMENTS

| | | | |
|---|---|---|---|
| 2011/0261728 A1* | 10/2011 | Ribeiro | H04W 28/26 370/280 |
| 2014/0036853 A1* | 2/2014 | Kim | H04W 16/14 370/329 |
| 2015/0250002 A1* | 9/2015 | Sun | H04W 74/0808 370/329 |
| 2017/0063479 A1* | 3/2017 | Kim | H04W 24/10 |
| 2017/0208475 A1* | 7/2017 | Yi | H04W 16/14 |

* cited by examiner

CHANNEL RESERVATION TECHNIQUES FOR UNLICENSED SPECTRUM

CROSS REFERENCES

The present Application for Patent claims priority to U.S. Provisional Patent Application No. 62/287,604 by Mallik et al., entitled "Channel Reservation Techniques for Unlicensed Spectrum," filed Jan. 27, 2016, assigned to the assignee hereof.

BACKGROUND

The following relates generally to wireless communication, and more specifically to channel reservation techniques for unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple access systems include code division multiple access (CDMA) systems, time division multiple access (TDMA) systems, frequency division multiple access (FDMA) systems, and orthogonal frequency division multiple access (OFDMA) systems. A wireless multiple access communications system may include a number of base stations, each simultaneously supporting communication for multiple communication devices, which may be otherwise known as user equipment (UE).

Some wireless communications systems may operate using a first radio access technology (RAT), such as Long Term Evolution (LTE), and may include a number of base stations, each simultaneously supporting communications with multiple UEs. A second wireless communications multiple access system may operate according to a second RAT, e.g. Wi-Fi (e.g., IEEE 802.11), that may include a number of access points (APs) supporting communication with multiple stations in a shared frequency spectrum.

In some cases base stations and UEs, operating according to a first RAT may communicate in a shared or unlicensed radio frequency (RF) spectrum. APs and stations operating according to another RAT, for example Wi-Fi, may also operate in overlapping areas using the same unlicensed RF spectrum. The Wi-Fi devices may be able to contend with other Wi-Fi devices for access to a contention-based channel of the unlicensed RF spectrum according to established Wi-Fi contention protocols. For example the Wi-Fi devices may use IEEE 802.11 request to send (RTS)/clear to send (CTS) procedures. The RTS/CTS procedures may use certain control frames that have established control frame formats, for example, RTS, CTS, and/or CTS-to-self control frames. However, base stations and UEs using the first RAT and attempting to communicate using the unlicensed RF spectrum may not be able to effectively contend for access to the contention-based channel using these existing procedures. Thus, control frames or other control transmissions used to contend for the contention-based channel may not be understandable between a base station and/or UE and a Wi-Fi device. For example, the base stations and UEs may communicate using a different or larger channel bandwidth than the Wi-Fi devices. Where the base stations and/or UEs, as well as the Wi-Fi devices, are not able to effectively communicate in the same unlicensed RF spectrum without frame collisions, communications may be delayed, increasing communications latency.

Even where base stations and UEs operate according to the same RAT, a mechanism to contend for a contention-based channel may be desirable when transmitting in an unlicensed RF spectrum, for example to reduce frame collisions introduced by the hidden nodes problem (e.g., wireless nodes that are close to a receiver, but out of range from a transmitter) introduced by neighboring base stations and/or UEs that may transmit during the same time using the same shared or unlicensed RF spectrum. Unlicensed spectrum generally refers to spectrum available for use without a license and is typically subject to technical rules regarding access and transmitted power. Shared spectrum generally refers to spectrum that is licensed to one or more operators but follows some device coexistence procedures (e.g., a licensed radio frequency spectrum band having more than one licensed operator, a licensed radio frequency spectrum band having a prioritized operator, but providing for opportunistic sharing of resources, etc.).

SUMMARY

Improved techniques to contend for a contention-based channel in unlicensed radio frequency (RF) spectrum are described. These techniques may enable a wireless device, for example a base station, to broadcast a channel reservation transmission that is understandable by other base stations and user equipments (UEs) operating in the same unlicensed RF spectrum. The channel reservation transmission may include a duration of a transmit opportunity and a clear channel assessment (CCA) procedure allocation of uplink (UL) and downlink (DL) resources for the base station and UEs. It may also include a channel state information (CSI) request for receiving UEs. The channel reservation transmission may also include within it a channel reservation transmission of a format understandable by other wireless devices operating in the same unlicensed RF spectrum, but operating according to a different radio access technology (RAT), for example Wi-Fi. The base station may broadcast a channel reservation transmission that includes, for example as a header, a Wi-Fi clear to send (CTS)-to-self control frame. The broadcast of the channel reservation transmission may be sent over a channel that includes multiple sub-bands (e.g. multiple channels), where the channel reservation transmission CTS-to-self control frame is sent in each of the multiple sub-bands, so that Wi-Fi devices that may only operate within one sub-band of the channel may receive and understand the Wi-Fi CTS-to-self frame.

Neighboring wireless devices, which may be other base stations or UEs, as well as Wi-Fi access points (APs) and stations, operating in the same unlicensed RF spectrum may then refrain from transmitting during the transmission opportunity duration identified by the received channel reservation transmission.

One or more UEs identified as recipients by the channel reservation transmission may receive the broadcasted channel reservation request, and respond with a channel reservation response transmission. The response may include a CSI report in response to the CSI request. The channel reservation response transmission may also include a transmit (Tx) identity (ID) to aid in interference calculation caused by the transmitter of the channel reservation response transmission, or an interference threshold indicator. In some cases, some of the UEs may transmit a sounding reference signal (SRS) in response to an SRS request that is broadcast by the base station. The base station may schedule UL and/or DL transmissions with one or more UEs based on the channel reservation response transmission and/or SRS.

A channel reservation transmission may also be a repurposed Wi-Fi CTS-to-self frame (or Wi-Fi request to send (RTS) frame), and a channel reservation response transmission may be a repurposed Wi-Fi CTS frame. Such repurposed control frames may be easier for Wi-Fi devices to detect. In these repurposed Wi-Fi control frames, the bits of the receiver address (RA) field may be reinterpreted to identify a base station, identify a UE, and provide a payload, where the payload may include a tolerated interference associated with the receiving device, a priority, and/or a CSI report.

A method of wireless communication at a base station is described. The method may include identifying a transmission opportunity duration for a transmission, determining an allocation between DL transmissions and UL transmissions for the identified transmission opportunity duration and broadcasting, in an unlicensed RF spectrum band, a channel reservation transmission indicating the identified transmission opportunity duration and the determined allocation.

An apparatus for wireless communication is described. The apparatus may include means for identifying a transmission opportunity duration for a transmission, means for determining an allocation between DL transmissions and UL transmissions for the identified transmission opportunity duration and means for broadcasting, in an unlicensed RF spectrum band, a channel reservation transmission indicating the identified transmission opportunity duration and the determined allocation.

A further apparatus is described. The apparatus may include a processor, memory in electronic communication with the processor, and instructions stored in the memory. The instructions may be executable by the processor to cause the processor to identify a transmission opportunity duration for a transmission, determine an allocation between DL transmissions and UL transmissions for the identified transmission opportunity duration and broadcast, in an unlicensed RF spectrum band, a channel reservation transmission indicating the identified transmission opportunity duration and the determined allocation.

A non-transitory computer-readable medium for wireless communication is described. The non-transitory computer-readable medium may include instructions to cause a processor to identify a transmission opportunity duration for a transmission, determine an allocation between DL transmissions and UL transmissions for the identified transmission opportunity duration and broadcast, in an unlicensed RF spectrum band, a channel reservation transmission indicating the identified transmission opportunity duration and the determined allocation.

Some examples of the method, apparatus, or non-transitory computer-readable medium described above may further include processes, features, means, or instructions for receiving a channel reservation response transmission comprising a CSI report. Some examples of the method, apparatus, or non-transitory computer-readable medium described above may further include processes, features, means, or instructions for transmitting a CSI request in the channel reservation transmission, where the CSI report is received before a DL transmission associated with the channel reservation transmission.

Some examples of the method, apparatus, or non-transitory computer-readable medium described above may further include processes, features, means, or instructions for receiving a channel reservation response transmission comprising an interference threshold indicator associated with a UE. Some examples of the method, apparatus, or non-transitory computer-readable medium described above may further include processes, features, means, or instructions for determining interference caused at the UE based at least in part on the received channel reservation response transmission. In some examples of the method, apparatus, or non-transitory computer-readable medium described above, the channel reservation response transmission includes a Tx ID and determining interference caused at the UE is based on the Tx ID.

In some examples of the method, apparatus, or non-transitory computer-readable medium described above, broadcasting the channel reservation transmission includes broadcasting the channel reservation transmission across multiple sub-bands of a channel. Some examples of the method, apparatus, or non-transitory computer-readable medium described above may further include processes, features, means, or instructions for receiving a SRS. Some examples of the method, apparatus, or non-transitory computer-readable medium described above may further include processes, features, means, or instructions for scheduling UL transmissions based on the received SRS.

Some examples of the method, apparatus, or non-transitory computer-readable medium described above may further include processes, features, means, or instructions for transmitting an SRS request in the channel reservation transmission, where the SRS is received before the DL transmission associated with the channel reservation transmission. Some examples of the method, apparatus, or non-transitory computer-readable medium described above may further include processes, features, means, or instructions for transmitting an SRS request along with a DL grant for DL transmissions associated with the channel reservation transmission, where the SRS is received after the DL transmissions.

In some examples of the method, apparatus, or non-transitory computer-readable medium described above, the determined allocation of DL transmissions is for a first set of users and the determined allocation of UL transmissions is for a second set of users, where one or more of the first set of users is different than one or more of the second set of users.

Some examples of the method, apparatus, or non-transitory computer-readable medium described above may further include processes, features, means, or instructions for receiving a first CSI report associated with a first portion of the transmission opportunity duration. Some examples of the method, apparatus, or non-transitory computer-readable medium described above may further include processes, features, means, or instructions for transmitting a first DL transmission during the first portion of the transmission opportunity duration based on the first CSI report. Some examples of the method, apparatus, or non-transitory computer-readable medium described above may further include processes, features, means, or instructions for receiving a second CSI report associated with a second portion of the transmission opportunity duration. Some examples of the method, apparatus, or non-transitory computer-readable medium described above may further include processes, features, means, or instructions for transmitting a second DL transmission during the second portion of the transmission opportunity duration based on the second CSI report.

Some examples of the method, apparatus, or non-transitory computer-readable medium described above may further include processes, features, means, or instructions for receiving the first CSI report in a first channel reservation response transmission. Some examples of the method, apparatus, or non-transitory computer-readable medium described above may further include processes, features, means, or instructions for receiving the second CSI report in a second channel reservation response transmission.

In some examples of the method, apparatus, or non-transitory computer-readable medium described above, the channel reservation transmission has a field format of one or both of a Wi-Fi RTS transmission, a Wi-Fi CTS transmission, or a Wi-Fi CTS-to-self transmission, including a RA field, and the identified transmission opportunity duration and the determined allocation are included in the RA field.

In some examples of the method, apparatus, or non-transitory computer-readable medium described above, the channel reservation transmission comprises a Wi-Fi CTS-to-self transmission and a physical downlink control channel (PDCCH), and an interference threshold indicator is carried by one or both of the Wi-Fi CTS-to-self transmission and the PDCCH.

In some examples of the method, apparatus, or non-transitory computer-readable medium described above, the interference threshold indicator and a physical (PHY) frame format indicator channel (PFFICH) payload are carried by the Wi-Fi CTS-to-self transmission. In some examples of the method, apparatus, or non-transitory computer-readable medium described above, the PDCCH is a broadcast PDCCH that carries the interference threshold indicator.

Some examples of the method, apparatus, or non-transitory computer-readable medium described above may further include processes, features, means, or instructions for detecting a channel reservation response transmission from a UE of a different operator. Some examples of the method, apparatus, or non-transitory computer-readable medium described above may further include processes, features, means, or instructions for determining a location of the UE of the different operator based on the detected channel reservation response transmission.

Some examples of the method, apparatus, or non-transitory computer-readable medium described above may further include processes, features, means, or instructions for detecting a channel reservation response transmission from a UE of a different operator. Some examples of the method, apparatus, or non-transitory computer-readable medium described above may further include processes, features, means, or instructions for refraining from transmitting during the identified transmission opportunity duration based at least in part on the detection.

Some examples of the method, apparatus, or non-transitory computer-readable medium described above may further include processes, features, means, or instructions for detecting a channel reservation transmission from a base station of a different operator. Some examples of the method, apparatus, or non-transitory computer-readable medium described above may further include processes, features, means, or instructions for refraining from transmitting during the identified transmission opportunity duration based at least in part on the detection.

A method of wireless communication at a UE is described. The method may include receiving, in an unlicensed RF spectrum band, a channel reservation transmission indicating a transmission opportunity and an allocation of DL transmissions and UL transmissions, determining CSI associated with the transmission opportunity, and transmitting a CSI report in a channel reservation response transmission.

An apparatus for wireless communication is described. The apparatus may include means for receiving, in an unlicensed RF spectrum band, a channel reservation transmission indicating a transmission opportunity and an allocation of DL transmissions and UL transmissions, means for determining CSI associated with the transmission opportunity, and means for transmitting a CSI report in a channel reservation response transmission.

A further apparatus is described. The apparatus may include a processor, memory in electronic communication with the processor, and instructions stored in the memory. The instructions may be executable by the processor to cause the processor to receive, in an unlicensed RF spectrum band, a channel reservation transmission indicating a transmission opportunity and an allocation of DL transmissions and UL transmissions, determine CSI associated with the transmission opportunity, and transmit a CSI report in a channel reservation response transmission.

A non-transitory computer-readable medium for wireless communication is described. The non-transitory computer-readable medium may include instructions to cause a processor to receive, in an unlicensed RF spectrum band, a channel reservation transmission indicating a transmission opportunity and an allocation of DL transmissions and UL transmissions, determine CSI associated with the transmission opportunity, and transmit a CSI report in a channel reservation response transmission.

In some examples of the method, apparatus, or non-transitory computer-readable medium described above, the channel reservation transmission comprises a CSI request. In some examples of the method, apparatus, or non-transitory computer-readable medium described above, transmitting the CSI report in the channel reservation response transmission comprises transmitting the CSI report in a physical uplink control channel (PUCCH) in the channel reservation response transmission, where the Wi-Fi CTS transmission carries an interference threshold indicator.

In some examples of the method, apparatus, or non-transitory computer-readable medium described above, transmitting the CSI report in the channel reservation response transmission comprises transmitting the CSI report in a first PUCCH in the channel reservation response transmission. Some examples of the method, apparatus, or non-transitory computer-readable medium described above may further include processes, features, means, or instructions for transmitting an interference threshold indicator in a second PUCCH in the channel reservation response transmission.

Some examples of the method, apparatus, or non-transitory computer-readable medium described above may further include processes, features, means, or instructions for transmitting a Wi-Fi CTS transmission in the channel reservation response transmission. Some examples of the method, apparatus, or non-transitory computer-readable medium described above may further include processes, features, means, or instructions for transmitting the channel reservation response transmission across multiple sub-bands of a channel using a Wi-Fi waveform.

In some examples of the method, apparatus, or non-transitory computer-readable medium described above, the CSI report is frequency domain multiplexed across the channel reservation response transmission in multiple sub-bands of the channel. Some examples of the method, apparatus, or non-transitory computer-readable medium described above may further include processes, features, means, or instructions for detecting a second channel reservation response transmission from a wireless device of a different operator and refraining from transmitting on the UL during the transmission opportunity.

Some examples of the method, apparatus, or non-transitory computer-readable medium described above may further include processes, features, means, or instructions for detecting a channel reservation transmission from a base station of a different operator, determining interference for the base station, and refraining from transmitting during the transmission opportunity based on the determination.

Some examples of the method, apparatus, or non-transitory computer-readable medium described above may further include processes, features, means, or instructions for performing a CCA procedure. Some examples of the method, apparatus, or non-transitory computer-readable medium described above may further include processes, features, means, or instructions for determining that the CCA procedure has failed. Some examples of the method, apparatus, or non-transitory computer-readable medium described above may further include processes, features, means, or instructions for refraining from transmitting based on the failed CCA procedure.

Some examples of the method, apparatus, or non-transitory computer-readable medium described above may further include processes, features, means, or instructions for reporting one or both of a demodulation reference signal (DMRS) and a beacon measurement for the base station of a different operator.

DETAILED DESCRIPTION

Figure 1:
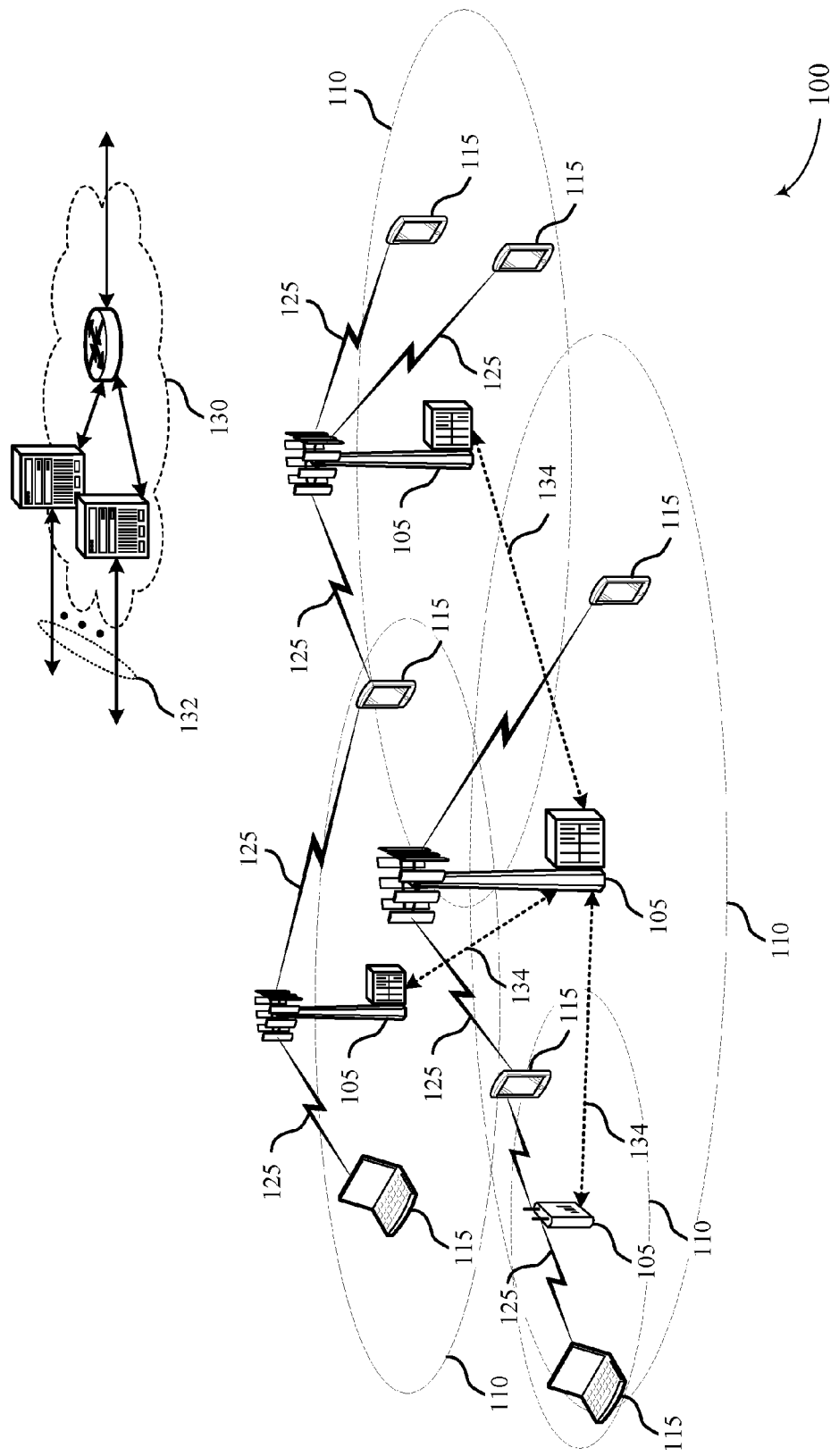
FIG. 1 illustrates an example of a wireless communications system that supports channel reservation techniques for unlicensed spectrum in accordance with aspects of the present disclosure.

A wireless device that uses a radio access technology (RAT), such as Long Term Evolution (LTE)/LTE-Advanced (LTE-A), may operate as a standalone carrier in multiple bands of shared or unlicensed radio frequency (RF) spectrum. As a result, the wireless device may use techniques from one RAT (e.g., LTE/LTE-A) to improve upon those used by a different RAT that also communicates within unlicensed RF spectrum, such as Wi-Fi. Channel reservation techniques, such as request to send (RTS) and clear to send (CTS) processes, may be used in Wi-Fi systems to resolve interference such as interference caused by hidden nodes (e.g., wireless nodes that are close to a receiver, but out of range from a transmitter). However, the absence of channel reservation techniques, for example for RATs like LTE/LTE-A operating in unlicensed RF spectrum, may result in inefficient communications due to interference, particularly in the presence of hidden nodes and bursty interference.

As a result, a wireless communications system operating across multiple bands of unlicensed spectrum may use channel reservation techniques that are improved on those used for Wi-Fi. That is, the wireless communications system may use a design that integrates certain RTS-like and CTS-like features (including CTS-to-self-like features) used in a Wi-Fi system to provide for more efficient communications and aid in understandability by neighboring Wi-Fi devices. Thus, an improved channel reservation design may reduce interference in communication and provide increased data throughput.

Improved techniques to contend for a contention-based channel in unlicensed RF spectrum are described. When operating in unlicensed spectrum, a base station may detect that a channel is clear following a successful clear channel assessment (CCA) procedure. The base station may then broadcast a channel reservation transmission across multiple sub-bands of the channel, for example frequency domain multiplexed across each of the 20 MHz sub-bands of an 80 MHz channel. The channel reservation transmission may be understandable by other base stations and user equipments (UEs) operating in the same unlicensed RF spectrum. The channel reservation transmission may include an identifier of a transmit opportunity duration and an allocation of uplink (UL) and downlink (DL) resources for the base station and UEs. It may also include a channel state information (CSI) request for receiving UEs. The channel reservation transmission may also include within it a channel reservation transmission of a format understandable by other wireless devices operating in the same unlicensed RF spectrum, but operating according to a different RAT, for example Wi-Fi. The base station may broadcast a channel reservation transmission that includes, for example as a header, a Wi-Fi CTS-to-self control frame. The broadcast of the channel reservation transmission may be sent over a channel that includes multiple sub-bands (e.g. multiple channels), where the channel reservation transmission CTS-to-self frame is sent in each of the multiple sub-bands, so that Wi-Fi devices that operate within one sub-band of the channel may receive and understand the Wi-Fi CTS-to-self frame. Neighboring wireless devices, which may be other base stations or UEs, as well as Wi-Fi access points (APs) and stations, operating in the same unlicensed RF spectrum may then refrain from transmitting during the transmission opportunity duration identified by the received channel reservation transmission.

One or more UEs may receive the broadcasted channel reservation request, including those identified as recipients by the channel reservation transmission, and respond with a channel reservation response transmission. The base station may receive a channel reservation response transmission from one or more of the UEs. The response may include a CSI report in response to the CSI request. In some cases, the CSI report may be frequency domain multiplexed across the frequency spectrum (e.g., across the 20 MHz sub-bands of an 80 MHz channel). The channel reservation response transmission may also include a transmit (Tx) identity (ID) to aid in interference calculation caused by the transmitter of the channel reservation response transmission, or an interference threshold indicator. In some cases, some of the UEs may transmit a sounding reference signal (SRS) in response to an SRS request that is broadcast by the base station. The base station may schedule UL and DL transmissions with one or more UEs based on the channel reservation response transmission and/or SRS.

Transmissions of the channel reservation and the channel reservation response may be efficiently detected in nearby or neighboring cells, including by nearby wireless devices (e.g., neighboring base stations or UEs in a neighboring cell associated with a neighboring base station), based on the configuration of the transmissions. For example, the channel reservation transmission may include portions that have a field format of a Wi-Fi RTS transmission, a Wi-Fi CTS transmission, or a Wi-Fi CTS-to-self transmission. Incorporating all or part of such Wi-Fi field formats into the channel reservation transmission may allow for reliable detection of the channel reservation transmissions, and may be auto-correlation based. The Wi-Fi field format may include a receiver address (RA) field that may be used to include a further channel reservation transmission payload, such as the transmission opportunity duration and the allocation of DL/UL resources as discussed above.

In some cases, a Wi-Fi CTS-to-self and/or Wi-Fi CTS transmissions may be used as part of the channel reservation and channel reservation response transmissions, for example, to allow a neighbor station to read the channel reservation transmission. Different configurations using Wi-Fi channel reservation transmissions may allow for improved detection of the broadcast of the channel reservation transmission from a base station and the channel reservation response transmission from a UE.

To prevent UL transmissions from interfering with DL transmissions, and vice versa, the serving base station of a first UE attempting to transmit during a second UEs transmission opportunity may detect the channel reservation response transmission from the second UE. Additionally or alternatively, the first UE may detect the channel reservation response transmission from the second UE, or the first UE may not pass a short CCA before an UL transmission.

A channel reservation transmission may also be a repurposed Wi-Fi CTS-to-self frame (or Wi-Fi RTS frame), and a channel reservation response transmission may be a repurposed Wi-Fi CTS frame. Such repurposed control frames may be easier for Wi-Fi devices to detect. In these repurposed Wi-Fi control frames, the RA field may be reinterpreted to identify a base station, identify a UE, and provide a payload, where the payload may include a tolerated interference associated with the receiving device, a priority, and/or a CSI report.

Aspects of the disclosure are initially described in the context of a wireless communication system. Further examples are provided of channel reservation broadcasts and channel reservation configurations that allow for reduced interference from transmissions in neighboring cells. Aspects of the disclosure are further illustrated by and described with reference to apparatus diagrams, system diagrams, diagrams, and flowcharts that relate to channel reservation techniques for unlicensed spectrum.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a LTE/LTE-A network. The broadcast of a channel reservation transmission may allow for higher throughput and reduced interference for wireless devices operating in unlicensed spectrum.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, a machine type communication (MTC) device, etc.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved Node Bs (eNBs) 105.

Wireless wide area networks (WWANs), such as LTE/LTE-A networks, may include a number of base stations 105, each simultaneously supporting communications for multiple UEs 115. Communications in such WWANs may be transmitted over multiple radio frequency bands (e.g., an 80 MHz band that includes four 20 MHz bands) in a dedicated or licensed spectrum. WWANs may coexist with wireless local area networks (WLANs), such as Wi-Fi networks, which may include a number of base stations 105 or APs that simultaneously support communication for multiple mobile devices or stations over a shared or unlicensed spectrum. WLANs may use contention-based procedures, such as a CCA, that include communicating one or more control frames prior to establishing a communication link in unlicensed frequency spectrum. Devices in a WLAN may transmit and receive certain control frames to reduce frame collisions in the WLAN. Examples of such control frames in a Wi-Fi network include RTS, CTS, and CTS-to-self frames RTS, CTS, and/or CTS-to-self frames may be used for channel reservation by stations (wireless devices). A transmitting station that wants to reserve the channel may send an RTS. A receiving station may then send a CTS following the soliciting RTS to acknowledge receipt. Within an RTS frame, a RA field may indicate the address of an intended recipient, and a transmitter address (TA) field may indicate an address of the transmitter. The RTS frame may further include a duration field (e.g., in μs) of the frame sequence including the expected CTS response and subsequent frame exchanges. The CTS frame that follows a soliciting RTS frame may contain an RA field that includes the TA of the station that sent the RTS, and a duration field that includes the RTS duration, less a short inter-frame space (SIFS) duration, and the CTS duration. A CTS frame that is the first frame in a sequence (a CTS-to-self transmission) may indicate the TA of the transmitting station in the RA field, and a duration field that indicates the duration of the subsequent frame exchange. Both RTS and CTS frames (and CTS-to-self frames) may contain a frame control field to identify the type of frame or packet (e.g., control, management, data, etc.). Each of these frames may also include a frame check sequence (FCS) (e.g., a cyclic redundancy check (CRC) sequence).

In some cases, a UE 115 or base station 105 may operate in a shared or unlicensed frequency spectrum. These devices may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power is that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence.

A base station 105 may gather channel condition information from a UE 115 in order to efficiently configure and schedule the channel. This information may be sent from the UE 115 in the form of a channel state report. A channel state report may contain an rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as cell-specific reference signals (CRS) or channel state information-reference signals (CSI-RS). RI and PMI may be excluded if the UE 115 does not support spatial multiplexing (or is not in support spatial mode). The types of information included in the report determines a reporting type. Channel state reports may be periodic or aperiodic. That is, a base station 105 may configure a UE 115 to send periodic reports at regular intervals, and may also request additional reports as needed. Aperiodic reports may include wideband reports indicating the channel quality across an entire cell bandwidth, UE selected reports indicating a subset of the sub-bands, or configured reports in which the sub-bands reported are selected by the base station 105.

An SRS may be transmitted by UE 115 using a predetermined sequence (e.g., a Zadoff-Chu sequence) so that a base station 105 may estimate the UL channel quality. An SRS transmission may not be associated with transmission of data on another channel, and may be transmitted periodically on a wide bandwidth (e.g., a bandwidth including more subcarriers than are allocated for UL data transmission). An SRS may also be scheduled on multiple antenna ports and may still be considered a single SRS transmission. An SRS transmission may be categorized as a Type 0 (periodically transmitted at equally spaced intervals) SRS or as a Type 1 (aperiodic) SRS. Thus, data gathered by a base station 105 from an SRS may be used to inform an UL scheduler. A base station 105 may also utilize an SRS to check timing alignment status and send time alignment commands to the UE 115-a.

In some cases, wireless communications system 100 may utilize one or more enhanced component carriers (eCCs). An eCC may be characterized by one or more features including flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1ms TTIs, whereas an eCC may use a TTI length of a single symbol, a pair of symbols, or a slot.

In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions). Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional hybrid automatic repeat request (HARM) related control information.

Figure 2:
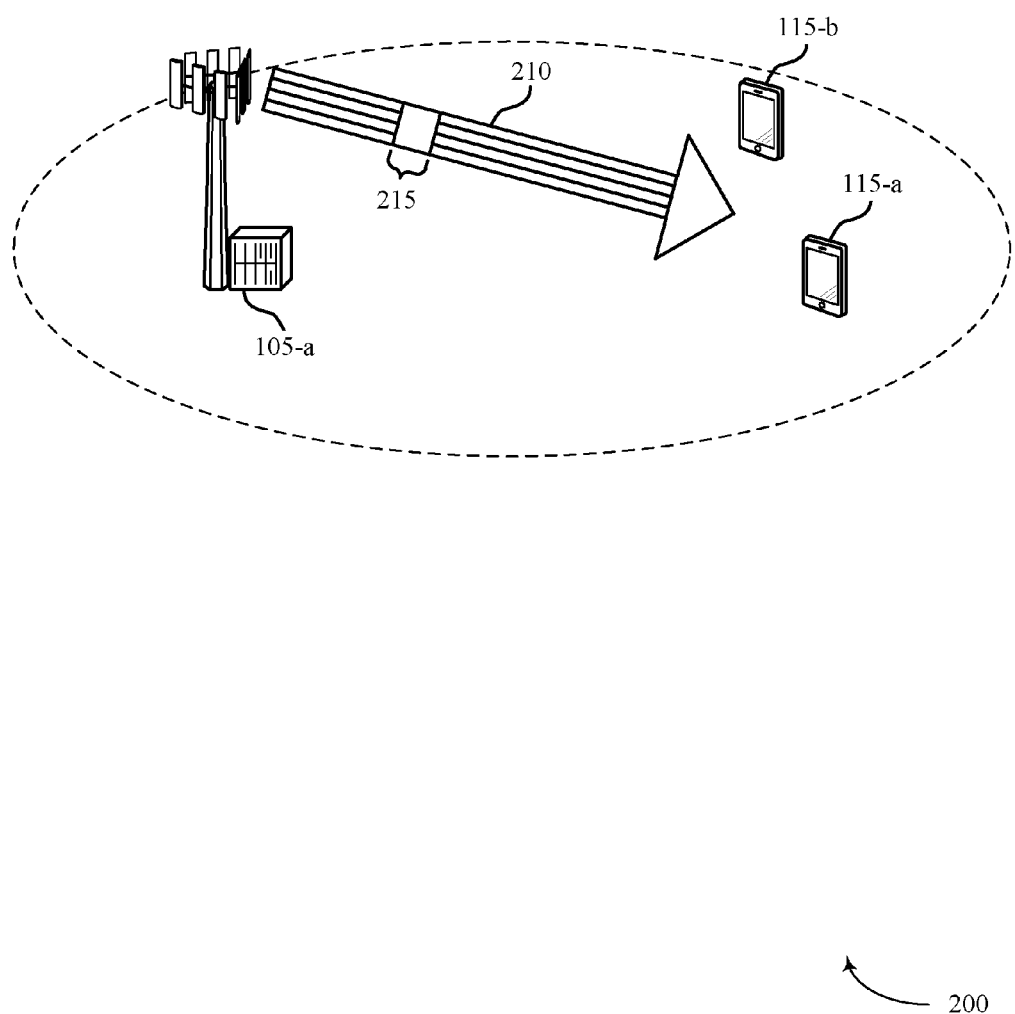
FIG. 2 illustrates an example of a wireless communications system that supports channel reservation techniques for unlicensed spectrum in accordance with aspects of the present disclosure.

FIG. 2 illustrates an example of a wireless communications system 200 for channel reservation techniques for unlicensed spectrum in accordance with aspects of the present disclosure. Wireless communications system 200 may include base station 105-a and UE 115-a, which may be examples of the corresponding devices described with reference to FIG. 1. Wireless communications system 200 may allow for improved throughput for data transmissions in a contention-based RF spectrum using a channel reservation broadcast.

When operating in unlicensed spectrum, base station 105-a may detect that a channel is clear following a successful CCA procedure. Base station 105-a may send a broadcast 210 that includes a channel reservation transmission 215 across multiple sub-bands of the channel. In response to the broadcast 210, base station 105-a may receive a channel reservation response transmission from one or more UEs 115 (e.g., UE 115-a, UE 115-b, or both). In some cases, the channel reservation transmission 215 may convey a transmission opportunity duration and an allocation of DL/UL frames within an upcoming transmission opportunity, which may enable efficient channel reuse. Additionally or alternatively, the channel reservation transmission 215 may include a CSI request for one or more UEs 115.

In some cases, a channel reservation response transmission may be received by base station 105-a from the one or more UEs 115 that includes a CSI report (e.g., a coarse CSI), where the CSI report may be frequency domain multiplexed across the frequency spectrum (e.g., 20 MHz). The channel reservation response transmission may also carry an interference threshold indicator. The interference threshold indicator may indicate an amount of interference that a station (such as UE 115-a) can tolerate in the form of interference from nearby transmitting stations. In some examples, the interference threshold may allow UE 115-b to simultaneously transmit in unlicensed spectrum during the transmission opportunity that UE 115-a is receiving DL data if those transmissions do not exceed the threshold. In some cases the interference threshold indicator may allow for a reception nulling ability in the event that a scheduled rank and a number of receive antennas do not match.

The channel reservation response transmission may include a Tx ID, which may be used to calculate interference at UE 115-a or UE 115-b. In some cases, multiple instances of channel reservation transmission 215 or channel reservation response transmission may allow for relatively fast link adaptation and CSI reporting, which may lead to robust coexistence. In some cases, a delayed CSI may be used based on a previous pilot in the transmission opportunity.

The channel reservation transmission 215 and the channel reservation response transmission may be efficiently detected in nearby or neighboring cells, including by nearby wireless devices (e.g., including nearby base stations 105), based on the configuration of the transmissions. For example, the channel reservation transmission 215 may include portions that have a field format of a Wi-Fi RTS transmission, a Wi-Fi CTS transmission, or a Wi-Fi CTS-to-self transmission. These Wi-Fi field formats may allow for reliable detection of the channel reservation transmissions and may be auto-correlation based. The Wi-Fi field format may include the RA field, and this field may be used to include further channel reservation transmission payload, such as the transmission opportunity duration and the allocation of DL/UL resources as discussed above. In some cases, a channel reservation transmission payload may be included in a Wi-Fi CTS transmission with a different packet format.

In some cases, a Wi-Fi CTS-to-self and/or Wi-Fi CTS transmissions may be used as part of the channel reservation and channel reservation response transmissions, for example to allow a neighbor station to read the channel reservation transmission 215. For example, base station 105-a may transmit a Wi-Fi CTS-to-self transmission (or a Wi-Fi RTS transmission) with an enhanced physical (PHY) frame format indicator channel (ePFFICH) and a unicast or broadcast physical downlink control channel (PDCCH) as a channel reservation transmission 215. In such cases, the Wi-Fi CTS-to-self transmission may carry the interference threshold indicator and the ePFFICH payload, and wireless devices in a neighboring cell may not need to decode the PHY frame format indicator channel (PFFICH) or PDCCH. The UE 115 may correspondingly transmit a Wi-Fi CTS transmission with a CSI report in the PUCCH, where the Wi-Fi CTS transmission may carry the interference threshold indicator and duration, and wireless nodes in a neighboring cell may refrain from decoding the PUCCH.

In some examples, rather than using an UL control channel for transmission (e.g. PUCCH), UE 115-a or UE 115-b may transmit a channel reservation response transmission that includes a Wi-Fi CTS transmission and a CSI report in a PDCCH. The Wi-Fi CTS transmission may carry an interference threshold indicator and duration. In some instances, one or more UEs 115 may have a PDCCH decoder, but lack a PUCCH decoder. Transmission of the CSI report in a PDCCH, along with the Wi-Fi CTS transmission, may allow the one or more UEs 115 to decode both a channel reservation transmission and a channel reservation response transmission using a PDCCH decoder, even if the one or more UEs 115 lack a PUCCH decoder.

In another example, a Wi-Fi CTS-to-self transmission may be used along with ePFFICH and a broadcast PDCCH as a channel reservation transmission 215. In this case, the broadcast PDCCH may carry the interference threshold indicator, and wireless devices in neighboring cells may decode PFFICH and PDCCH for improved coexistence. In some cases, coexistence may be achieved by decoding the Wi-Fi CTS-to-self transmission. A UE 115 may transmit a Wi-Fi CTS transmission in addition to two UL control channels. In some examples, the two UL control channels may be a first PUCCH and a second PUCCH. The first PUCCH may carry serving cell information, such as a CSI report, and the second PUCCH may include the interference threshold indicator (in cases of unicast transmission), or may further include DL subframes (in cases of broadcast and/or unicast transmissions).

This configuration may allow for better detection of a broadcast of a channel reservation transmission 215 from base station 105-a and a channel reservation response transmission from UE 115-a and/or UE 115-b.

In some examples, rather than transmitting using two UL control channels, the UE may transmit a transmit a channel reservation response that includes two DL control channels, for example a first PDCCH and a second PDCCH, in addition to the Wi-Fi CTS transmission. The first PDCCH may carry serving cell information, such as a CSI report, and the second PDCCH may include the interference threshold indicator (in cases of unicast transmission), or may further include DL subframes (in cases of broadcast and/or unicast transmissions). Transmission using a first PDCCH and a second PDCCH may allow the one or more UEs to decode both a channel reservation transmission and a channel reservation response transmission using a PDCCH decoder, even if the one or more UEs lack a PUCCH decoder.

In some cases, the CSI may be carried in a control channel (e.g., PUCCH and/or PDCCH) in a frequency domain multiplexing manner (e.g. across each of the subchannels of a channel).

In some examples, decoding the Wi-Fi CTS transmission in a neighboring cell may be based on a 4 dB signal to noise ratio (SNR), but the transmission may be associated with decreased decoding complexity. The Wi-Fi CTS transmission may be configured to include the DL/UL allocation indication and interference threshold indicator. In some cases a Tx ID in the Wi-Fi CTS may not be used, and path loss may be estimated using reciprocity in cases where a fixed transmit power for CTS is used. Similarly, the Tx ID may not be included in the channel reservation response transmission, and interference may be determined based on the transmission of the channel reservation response transmission alone.

In some cases, base station 105-a may infer the relative positions of multiple UEs 115 with respect to neighboring nodes of another operator. For example, UE 115-a may report demodulation reference signal (DMRS) or beacon measurements for base stations of another operator, and may also detect any Wi-Fi RTS or Wi-Fi CTS transmissions from other wireless nodes. As a result, base station 105-a may infer a recent history of DL/UL scheduling successes and/or failures. That is, UE 115-b may not transmit on UL, even when it has been scheduled to transmit, because a single CCA may not pass. Similarly, if UE 115-b is able to reliably detect a channel reservation response transmission from a UE of a different operator, then it may refrain from transmitting on the UL, even when scheduled.

In some examples, a UE 115 that is close to a broadcasting base station (and thus has a relatively high SNR) may send its channel reservation response transmission at a lower transmit power. The transmit power of the channel reservation response transmission may be a function of the received power from a serving cell and/or background interference at the UE 115, where the background interference may be interference from wireless devices that do not refrain from transmission in the presence of channel reservation and channel reservation response messages.

Figure 3:
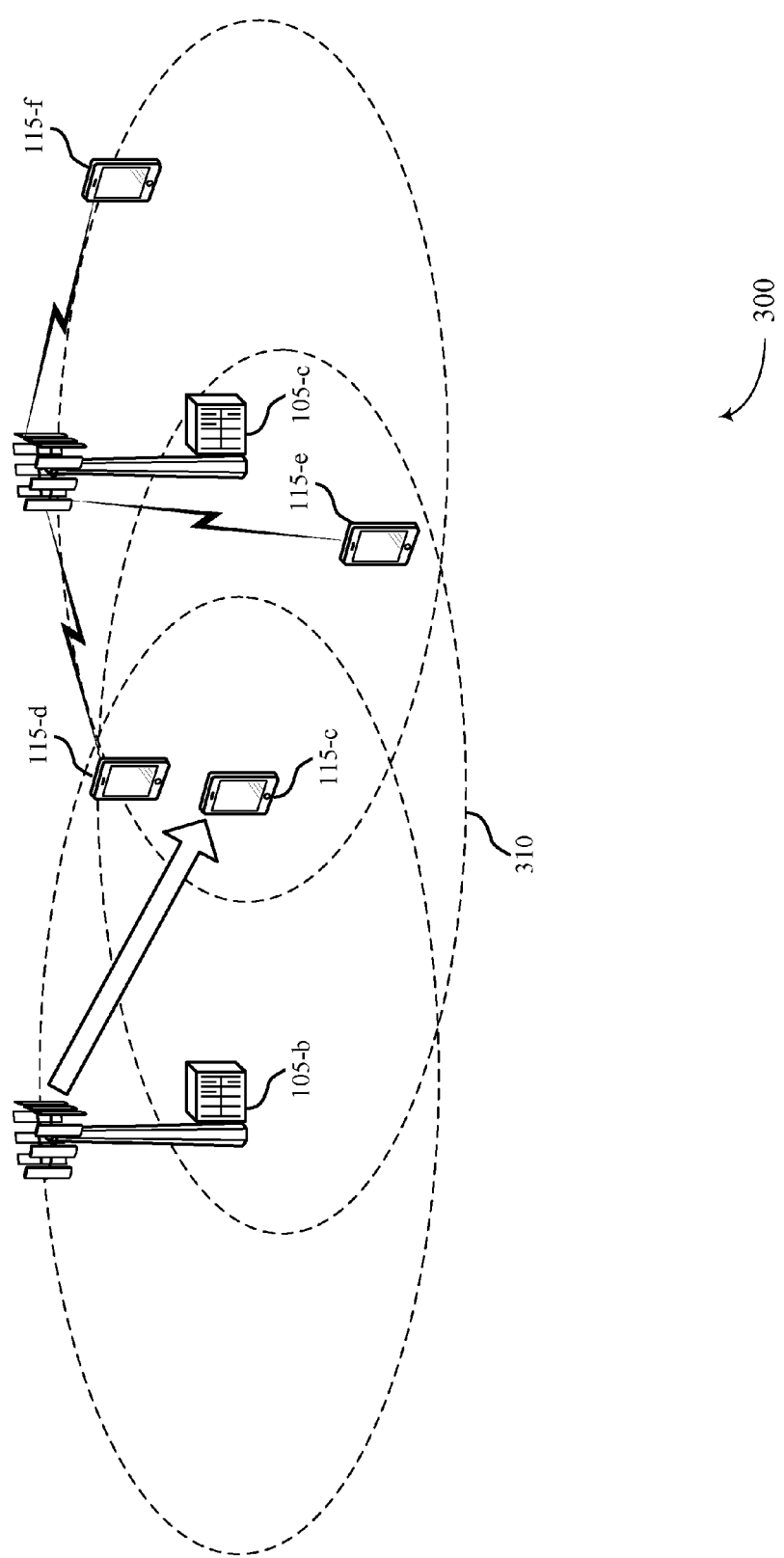
FIG. 3 illustrates an example of a wireless communications systems that support channel reservation techniques for unlicensed spectrum in accordance with aspects of the present disclosure.

FIG. 3 illustrates an example of a wireless communications system 300 that supports channel reservation techniques for unlicensed spectrum in accordance with aspects of the present disclosure. In some cases, wireless communications system 300 may represent aspects of techniques performed by a UE 115 or base station 105 as described with reference to FIGS. 1-2. Wireless communications system 300 may include a base station 105-b and UE 115-c that communicate as nodes of a first operator. Wireless communications system 300 may also include a base station 105-c, a UE 115-d, UE 115-e, and UE 115-f that communicate as nodes of a second operator. Wireless communications system 300 may illustrate examples of efficient interference reduction when transmitting a channel reservation response transmission in unlicensed spectrum.

Base station 105-b may transmit DL data to UE 115-c, and in order to prevent interference with this transmission, UEs 115 in neighboring cells may defer transmissions while base station 105-b and UE 115-c communicate. For example, if UE 115-d transmits UL information to base station 105-c, the transmission may result in interference at UE 115-c. To prevent interference, base station 105-c may detect a channel reservation response transmission from UE 115-c. Based on the detection of the channel reservation response transmission, base station 105-c may not schedule a UE 115-d for UL transmissions during the DL transmissions received by UE 115-c.

In some cases, base station 105-c may modify its UL and/or DL transmissions based on the detection of the channel reservation response transmission from UE 115-c. For example, base station 105-c may refrain from transmitting for a duration that UE 115-c is receiving. Additionally or alternatively, base station 105-c and/or UE 115-d may modify their UL and/or DL scheduling decisions following the detection of a channel reservation transmission from base station 105-b. For example, base station 105-c may refrain from transmitting for a duration that base station 105-b is receiving. Similarly, UE 115-d may choose not to transmit while base station 105-b is receiving.

In some examples, base station 105-c may be outside of the channel reservation response range 310 and may not detect a channel reservation response transmission from UE 115-c. However, UE 115-d that is located within channel reservation response range 310 may detect the channel reservation response transmission. Based on this detection, UE 115-d may refrain from any UL transmissions that is has been scheduled for by base station 105-c. That is, the detection of the channel reservation response transmission by UE 115-c may allow UE 115-d to override UL scheduling decisions made by base station 105-c.

In some cases, UE 115-d may fail to decode the channel reservation response transmission from UE 115-c. However, before UE 115-d sends an UL transmission, it may perform a CCA and detect that the channel is not clear. Based on the failed CCA, UE 115-d may refrain from sending UL transmissions.

In some examples, the channel reservation transmission and channel reservation response transmission may allow a base station to infer the location of other UEs. For example, UE 115-e may report measurements that indicate that UE 115-c is a greater distance away from UE 115-e. As a result, a decision may be made to allow UE 115-e to send UL transmissions while base station 105-b and UE 115-c communicate on DL. Similarly, UE 115-f may be in a location such that any UL transmission by UE 115-f may not interfere with the DL transmissions to UE 115-c. The determination of the locations of one or more UEs 115 may allow base station 105-c to determine that, based on the measurements, UEs 115-e and 115-f may be scheduled differently than UE 115-d. In some cases, the base station may use a history of transmission of DL/UL scheduling successes and failures to further identify how UEs 115 may be scheduled.

In order to prevent a large number of UEs from being unable to transmit in UL due to a large channel reservation response range, the interference threshold indicator may be used to allow some of the UEs 115 to transmit at the same time as UE 115-c is receiving DL information, as long as interference from these other UEs 115 does not exceed the indicated threshold.

Additionally or alternatively, the power at which the channel reservation response transmission is sent may be modulated according to certain parameters. For example, in order to prevent a maximum number of UEs from interfering with DL transmissions received by UE 115-c, the channel reservation response transmission may be sent at a relatively higher transmission power. Alternately, to allow other wireless devices to transmit, the channel reservation response transmission may be sent at a lower transmit power. In some cases, DL path loss may be used as an intermediary for UL path loss. That is, if the transmit power of a channel reservation response transmission is known or fixed, then interference may be estimated.

In some examples, to prevent UL transmissions from interfering with DL transmissions, a serving base station 105-c of UE 115-d attempting to transmit during a transmission opportunity scheduled for UE 115-c may detect the channel reservation response transmission from UE 115-c. Upon detection of the channel reservation response transmission, the serving base station 105-c may modify its behavior and refrain from scheduling any DL transmissions, since a DL transmission to any of its served UEs 115 may cause interference at UE 115-c, which is the UE that transmitted the channel reservation response transmission. Alternatively, serving base station 105-c may choose to schedule UE 115-d, UE 115-e, or UE 115-f on the UL, and send a channel reservation transmission and SRS requests to each of these UEs 115 to obtain an UL CSI report.

In one example, UE 115-d and UE 115-e may detect the channel reservation response transmission from UE 115-c and choose not to send an SRS in response to the SRS request from serving base station 105-c. UE 115-f, that did not detect the channel reservation response transmission from UE 115-c, may transmit SRS on the UL in response to SRS request from serving base station 105-c. Upon receiving the SRS from only UE 115-f, serving base station 105-c may infer that only UE 115-f can transmit on the UL, and may proceed to schedule only UE 115-f on the UL.

In another example, UE 115-d and UE 115-e may send an SRS regardless of receiving the channel reservation response transmission from UE 115-c. In some cases, serving base station 105-c may proceed to schedule UE 115-e and UE 115-f on the UL, and choose to not schedule UE 115-d since an MCS computed from the SRS transmitted by UE 115-d may indicate that UE 115-d is receiving a high level of interference from UE 115-c. Upon receiving an UL grant, UE 115-f may proceed to transmit on the UL as it did not detect a channel reservation response transmission from UE 115-c. However, UE 115-e may refrain from transmitting on the UL because the duration of the UL transmission indicated in the UL grant may overlap with the duration indicated in the channel reservation response transmission from UE 115-c that UE 115-e detected.

In some examples, interference at base station 105-b may be prevented following the broadcast of a channel reservation transmission. For example, if UE 115-d is associated with base station 105-c, then on receiving an UL grant from serving base station 105-c, and a channel reservation transmission from serving base station 105-c, UE 115-d will honor the UL grant and transmit on the UL. This is may be because the channel reservation signal was sent by serving base station 105-c to reserve the channel for the UL transmission by UE 115-d. However, if the channel reservation transmission received at UE 115-d is transmitted by another base station, for example base station 105-b, then UE 115-d may refrain from transmitting on the UL to base station 105-c because base station 105-b reserved the channel for some other transmission and an UL transmission from UE 115-d, for example to base station 105-c, may cause interference at base station 105-b.

In some cases, UE 115-e may detect the channel reservation response transmission from UE 115-c and may not send a channel reservation response transmission in response to a channel reservation transmission from its serving base station 105-c. In some examples, UE 115-e may be scheduled to send UL transmissions based on an UL grant received from its serving base station 105-c and refrain from transmitting following the detection of the channel reservation response transmission from UE 115-c. Additionally or alternatively, UE 115-e may detect the channel reservation response transmission from the UE 115-c, or UE 115-e may not pass a short CCA before an UL transmission.

Figure 4:
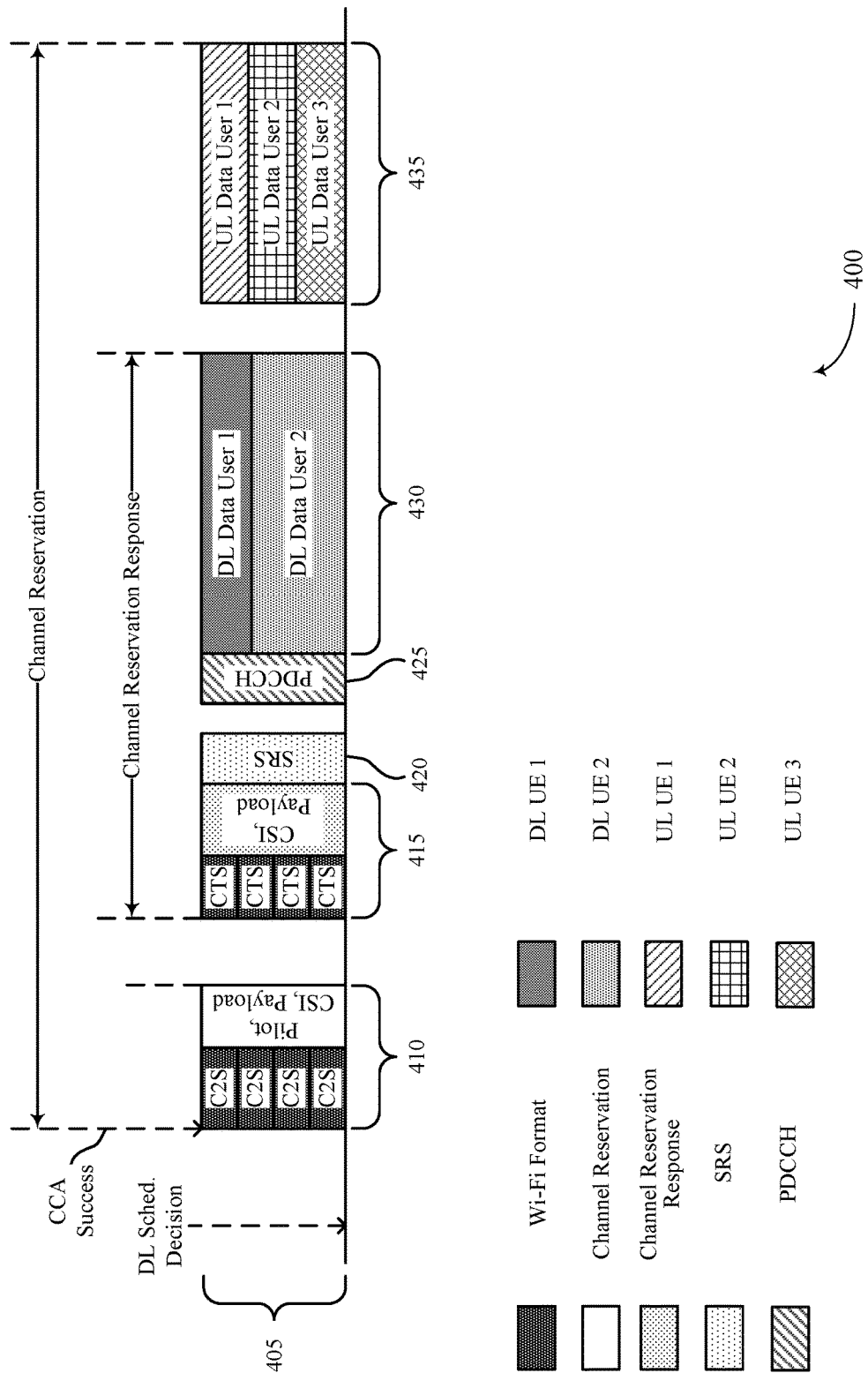
FIG. 4 illustrates an example of wireless communications in a system that supports channel reservation techniques for unlicensed spectrum in accordance with aspects of the present disclosure.

FIG. 4 illustrates an example of wireless communications 400 for channel reservation techniques for unlicensed spectrum in accordance with aspects of the present disclosure. In some cases, wireless communications 400 may represent aspects of techniques performed by a UE 115 or base station 105 as described with reference to FIGS. 1-2. Wireless communications 400 may allow for improved throughput for data transmissions in a contention-based RF spectrum.

In some examples, the wireless communications 400 may be transmitted over a channel 405 that includes multiple sub-bands (e.g., an 80 MHz channel of four 20 MHz bands) in an unlicensed RF band. When transmitting in channel 405, a base station 105 may determine that one or more UEs 115 may be scheduled for DL and/or UL transmissions during an identified transmission opportunity. The base station 105 may subsequently perform a CCA procedure to determine if the channel 405 is free for communication.

Upon a successful CCA, the base station may broadcast a channel reservation transmission 410. In some examples, the channel reservation transmission 410 may include a Wi-Fi CTS-to-self transmission across the sub-bands of the channel 405 and/or a transmission across all sub-bands. In some examples, the presence of the Wi-Fi CTS-to-self transmission may indicate the channel reservation to any nearby Wi-Fi nodes, which may enable those Wi-Fi nodes to refrain from transmitting in the channel 405. The channel reservation transmission 410 may also include a pilot signal or a payload, where the payload may include a CSI request, an allocation of DL and UL transmission for the transmission opportunity, and/or an SRS request.

After decoding the channel reservation transmission 410, the one or more UEs 115 may transmit a channel reservation response transmission 415. The channel reservation response transmission 415 may include a Wi-Fi CTS across each of sub-bands of the channel 405 and/or a transmission across all sub-bands. As discussed above, the Wi-Fi CTS may be used to defer transmissions from any nearby Wi-Fi nodes.

In some cases, the channel reservation response transmission may include a CSI report, a Tx ID, or an interference threshold indicator associated with a UE 115. For example, one or more UEs may decode the channel reservation transmission 410 and return a CSI report in response to a CSI request included in the channel reservation transmission 410. In some cases, one or more UEs may decode the SRS request included in the channel reservation transmission 410 and transmit an SRS 420. In some examples, the SRS may serve as a pilot. In some cases, the channel reservation transmission 410 may be used by the base station 105 to update its determination to schedule the one or more UEs for UL or DL transmissions. That is, a subset of the one or more UEs may be scheduled based on the channel reservation response transmission 415.

Following receipt of the channel reservation response transmission 415 and the SRS 420, the base station may proceed to schedule the one or more UEs 115 for DL and UL transmissions and may transmit a PDCCH 425, which may include DL and UL grants for DL data transmission 430 and UL data transmission 435. In some cases, the number of UEs 115 scheduled for DL data transmission 430 may include some of the one or more UEs 115 that received the broadcast. Similarly, UL data transmission 435 may include data transmissions for the UEs 115 that transmitted the channel reservation response transmission 415.

Figure 5:
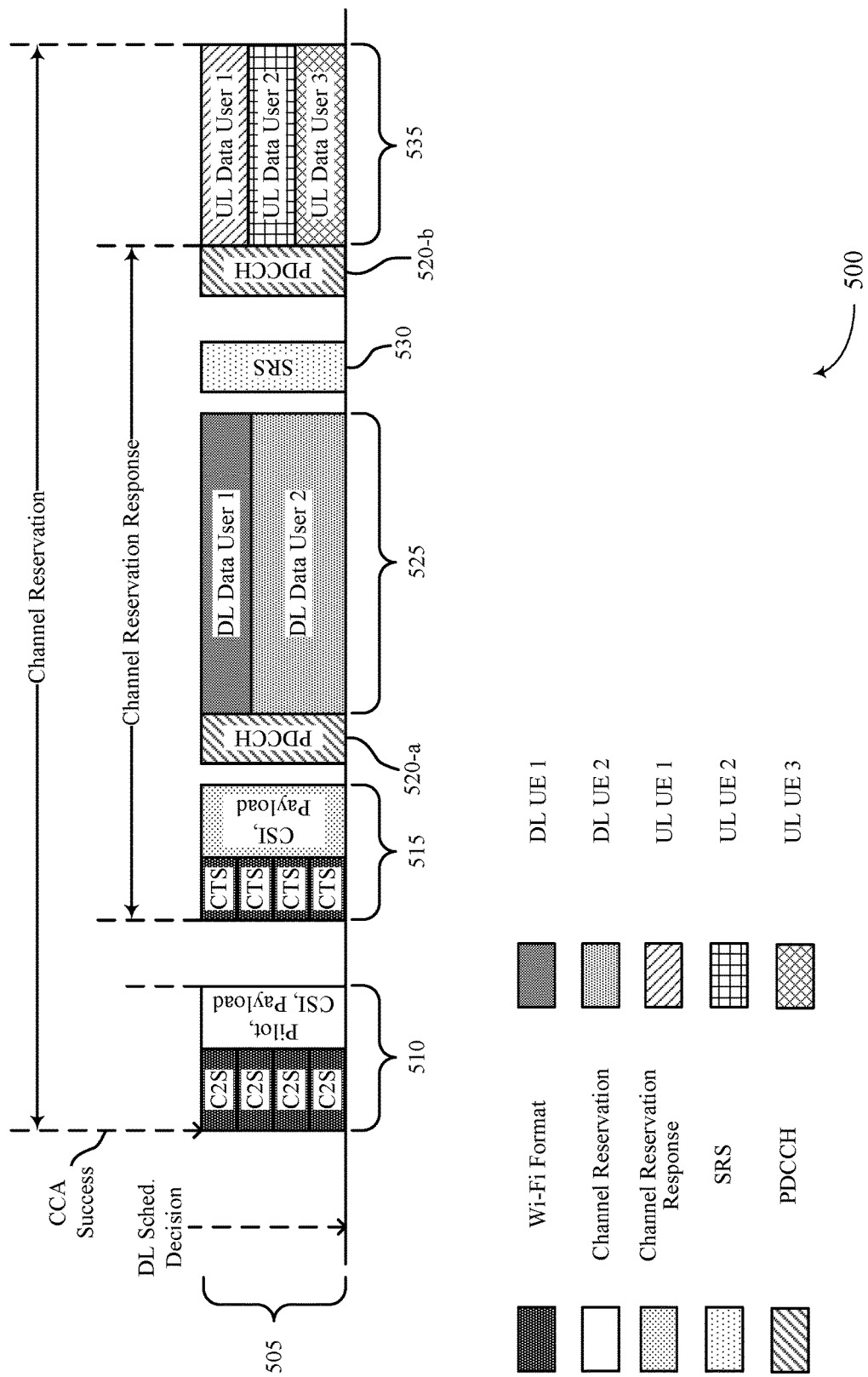
FIG. 5 illustrates an example of wireless communications in a system that supports channel reservation techniques for unlicensed spectrum in accordance with aspects of the present disclosure.

FIG. 5 illustrates an example of wireless communications 500 in a system that supports channel reservation techniques for unlicensed spectrum in accordance with aspects of the present disclosure. In some cases, wireless communications 500 may represent aspects of techniques performed by a UE 115 or base station 105 as described with reference to FIGS. 1-2. Wireless communications 500 may enable the transmission of a delayed SRS transmission to allow one or more UEs additional time to process a received SRS request.

The wireless communications 500 may be transmitted over a channel 505 that includes multiple sub-bands in an unlicensed RF band. When transmitting in the channel 505, a base station 105 may determine that one or more UEs 115 may be scheduled for DL and/or UL transmissions during an identified transmission opportunity. The base station 105 may subsequently perform a CCA procedure to determine if the channel 505 is free for communication.

As described with reference to FIG. 4, upon a successful CCA, the base station 105 may broadcast a channel reservation transmission 510. In some examples, the channel reservation transmission 510 may include a Wi-Fi CTS-to-self transmission across the sub-bands of the channel 505 and/or a transmission across all sub-bands. In some cases, channel reservation transmission 510 may include a pilot, a CSI request, and a payload, where an SRS request may be deferred to a later transmission. Additionally or alternately, SRS may be included with the channel reservation response transmission, which may allow for fewer transitions between UL and DL transmissions.

After decoding the channel reservation transmission 510, the one or more UEs 115 may transmit a channel reservation response transmission 515. The channel reservation response transmission 515 may include a Wi-Fi CTS across each of sub-bands of the channel 505 and/or a transmission across all sub-bands. In some examples, the Wi-Fi CTS may be duplications of the same control frame content in each of the sub-bands. In some examples, if the broadcast of the channel reservation transmission from the base station 105 is successful, interference at the base station 105 may not change over the duration of the transmission opportunity.

Following receipt of the channel reservation response transmission 515, the base station may proceed to schedule the one or more UEs 115 for DL and UL transmissions and may transmit a PDCCH 520-a, which may include DL grants for DL transmission 525 and an SRS request. In some cases, the number of UEs 115 scheduled for DL transmission 525 may include some of the one or more UEs 115 that received the broadcast.

Following DL transmission 525, one or more UEs 115 may transmit SRS 530 in response to the SRS request included in the PDCCH 520-a. The SRS may serve as a pilot signal, and the base station 105 may transmit a subsequent PDCCH 520-b following receipt of SRS 530. PDCCH 520-b may include an UL grant for UL transmission 535, which may include data transmissions from the one or more scheduled UEs 115.

Figure 6:
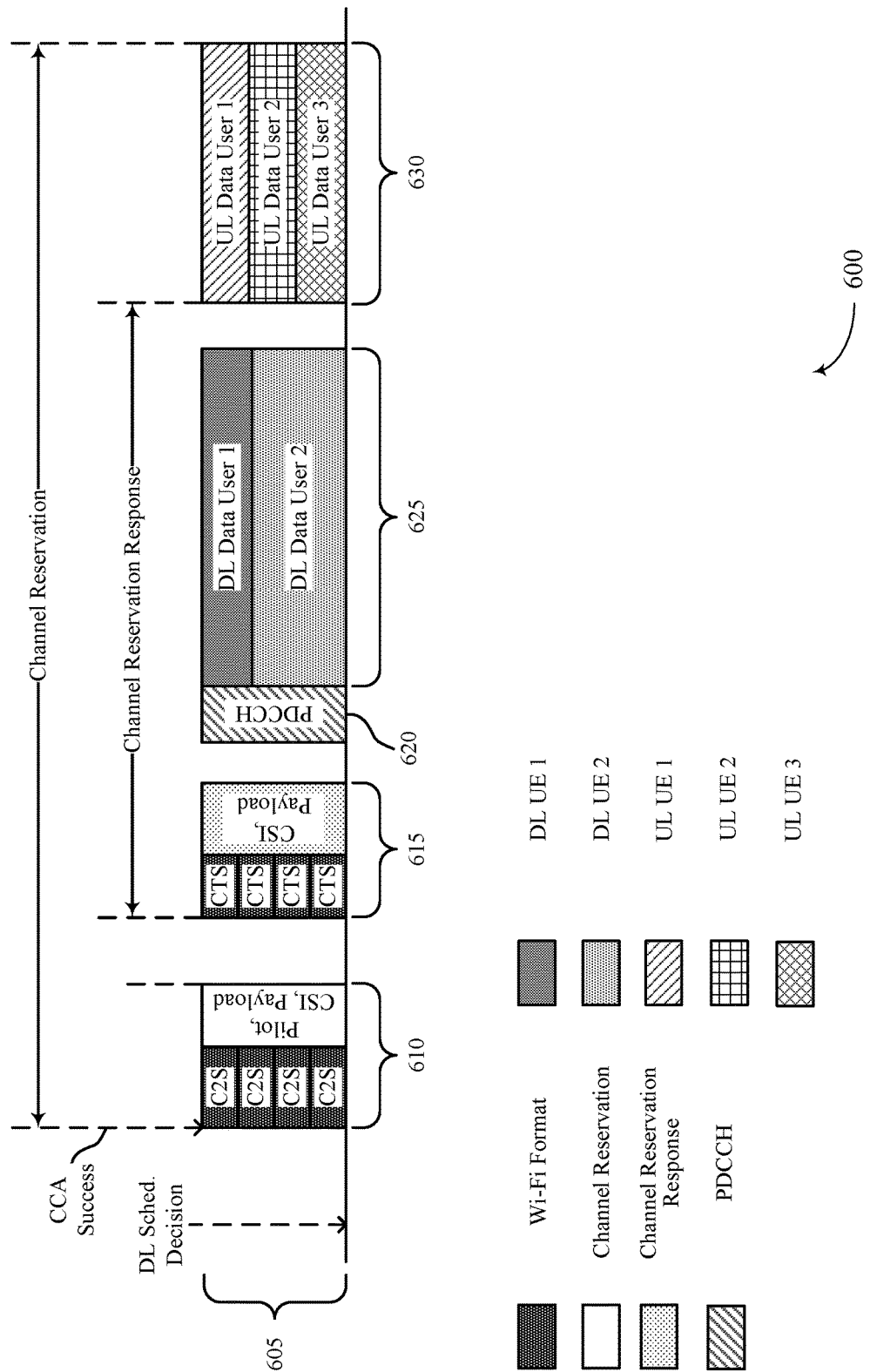
FIG. 6 illustrates an example of wireless communications in a system that supports channel reservation techniques for unlicensed spectrum in accordance with aspects of the present disclosure.

FIG. 6 illustrates an example of wireless communications 600 in a system that supports channel reservation techniques for unlicensed spectrum in accordance with aspects of the present disclosure. In some cases, wireless communications 600 may represent aspects of techniques performed by a UE 115 or base station 105 as described with reference to FIGS. 1-2. Wireless communications 600 may enable the scheduling of UL data without an SRS transmission.

The wireless communications 600 may be transmitted over a channel 605 that includes multiple sub-bands in an unlicensed RF band. When transmitting in the channel 605, a base station 105 may determine that one or more UEs 115 may be scheduled for DL and/or UL transmissions during an identified transmission opportunity. The base station 105 may subsequently perform a CCA procedure to determine if the channel 605 is free for communication.

As described with reference to FIGS. 4 and 5, upon a successful CCA, the base station 105 may broadcast a channel reservation transmission 610. In some examples, the channel reservation transmission 610 may include a Wi-Fi CTS-to-self transmission across the sub-bands of the channel 605 and/or a transmission across all sub-bands. In some cases, channel reservation transmission 610 may include a pilot, a CSI request, and a payload. After decoding the channel reservation transmission 610, the one or more UEs 115 may transmit a channel reservation response transmission 615. The channel reservation response transmission 615 may include a Wi-Fi CTS across the sub-bands of the channel 605 and/or a transmission across all sub-bands.

Following receipt of the channel reservation response transmission 615, the base station may proceed to schedule the one or more UEs 115 for DL and UL transmissions and may transmit a PDCCH 620, which may include DL grants for DL transmission 625 and UL grants for UL transmission 630.

Figure 7:
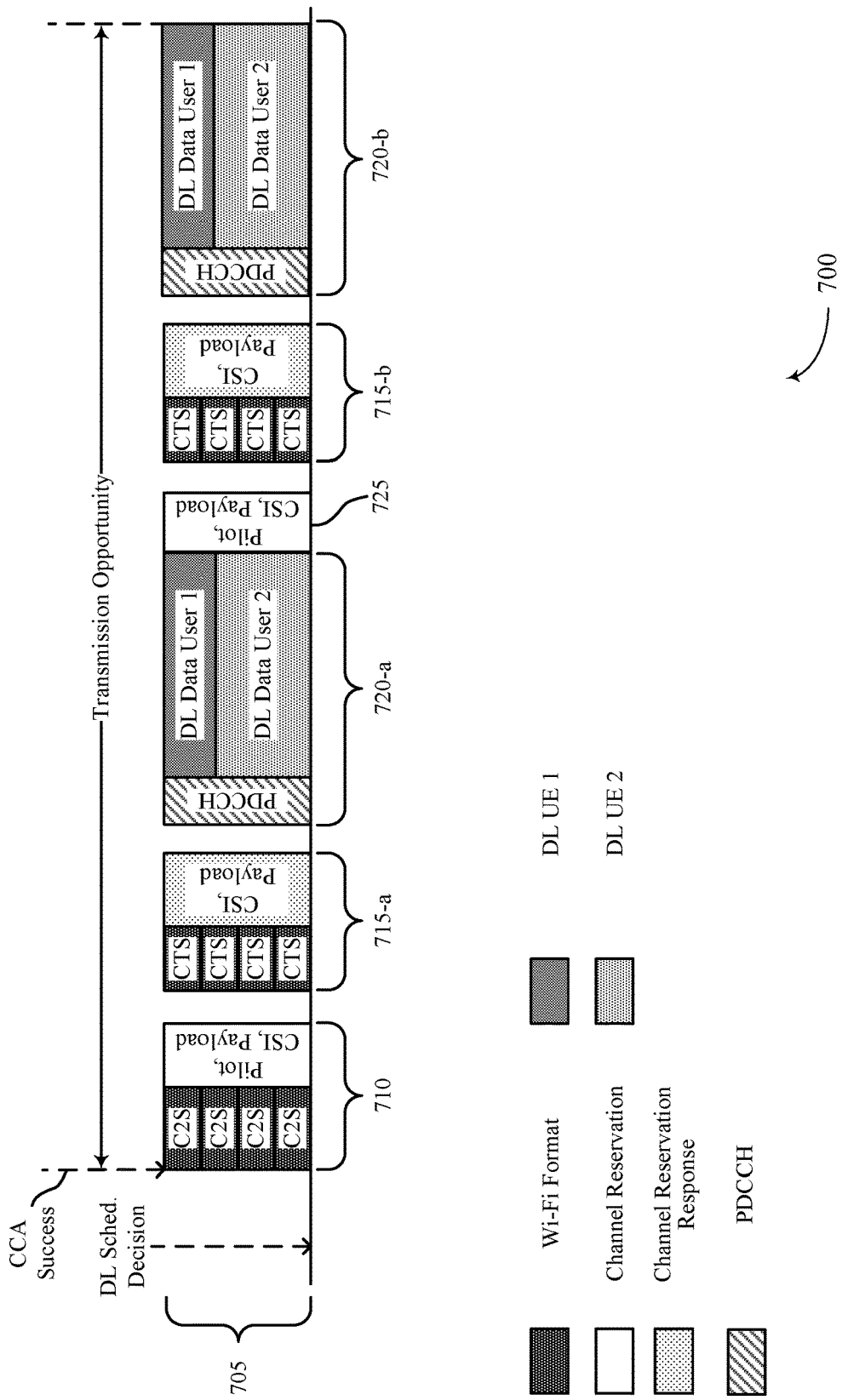
FIG. 7 illustrates an example of wireless communications in a system that supports channel reservation techniques for unlicensed spectrum in accordance with aspects of the present disclosure.

FIG. 7 illustrates an example of wireless communications 700 for channel reservation techniques for unlicensed spectrum in accordance with aspects of the present disclosure. In some cases, wireless communications 700 may represent aspects of techniques performed by a UE 115 or base station 105 as described with reference to FIGS. 1-2. Wireless communications 700 may allow for multiple instances of channel reservation response transmissions during a transmission time interval that enable frequent updating of CSI.

The wireless communications 700 may be transmitted over a channel 705 that includes multiple sub-bands in an unlicensed RF band. When transmitting in the channel 705, a base station 105 may determine that one or more UEs 115 may be scheduled for DL and/or UL transmissions during an identified transmission opportunity. The base station 105 may subsequently perform a CCA procedure to determine if the channel 605 is free for communication.

As described with reference to FIGS. 4, 5, and 6, upon a successful CCA, the base station 105 may broadcast a channel reservation transmission 710. After decoding the channel reservation transmission 710, the one or more UEs 115 may transmit a first channel reservation response transmission 715-a. Based on the information in the first channel reservation response transmission 715-a, the base station may schedule a DL transmission for the one or more UEs 115, and may transmit DL data transmission 720-a, which may include a PDCCH and data for the one or more UEs.

In addition to first DL data transmission 720-a, the base station 105 may transmit a second channel reservation transmission 725. The one or more UEs may decode the second channel reservation transmission 725 and transmit a second channel reservation response transmission 715-b. Based on the information in the second channel reservation response transmission 715-b, the base station 105 may transmit a DL data transmission 720-b for the one or more UEs 115 scheduled to receive data. In other examples of wireless communications 700, a different number of channel reservation transmissions may be broadcast, and a different number of channel reservation response transmissions 715 may be sent in response.

Figure 8:
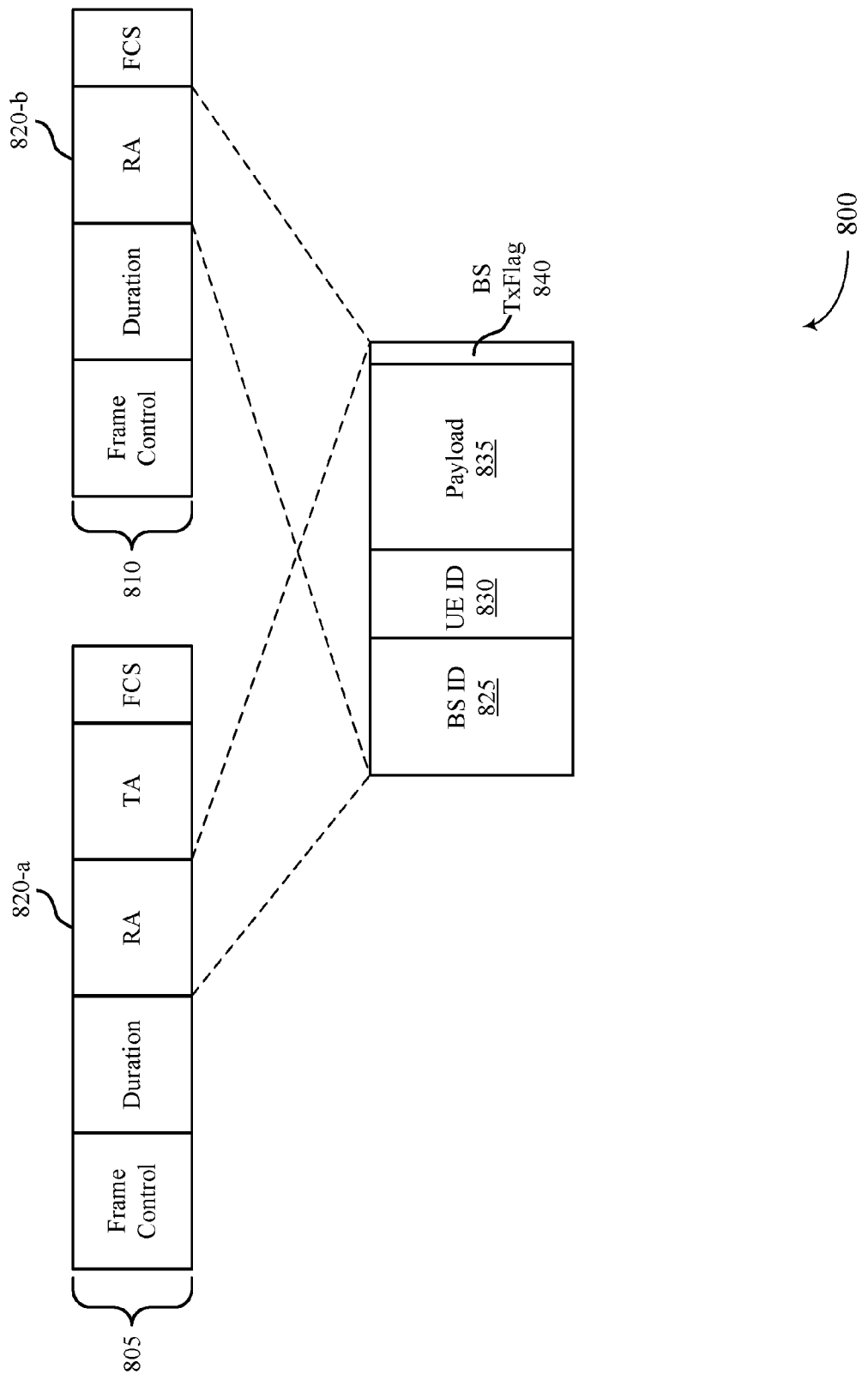
FIG. 8 illustrates an example of Wi-Fi control frame configurations for channel reservation techniques for unlicensed spectrum in accordance with aspects of the present disclosure.

FIG. 8 illustrates an example of Wi-Fi control frame configurations 800 for channel reservation techniques for unlicensed spectrum in accordance with aspects of the present disclosure. Wi-Fi control frame configurations 800 may represent aspects of techniques performed by a base station 105 and UE 115, which may be examples of the corresponding devices described with reference to FIG. 1-2. In some cases, a channel reservation request may be transmitted using a Wi-Fi waveform, which may allow for efficient detection of channel reservation and channel reservation response transmissions.

Wi-Fi control frame configurations 800 may include a Wi-Fi RTS transmission 805 and a Wi-Fi CTS transmission 810. Wi-Fi RTS transmission 805 may include multiple fields, including frame control, duration, RA, TA, and FCS fields. Wi-Fi CTS transmission 810 may also include multiple fields, including frame control, duration, RA, and FCS fields. In some cases, an RA field 820-a in Wi-Fi RTS transmission 805, and RA field 820-b in Wi-Fi CTS transmission 810 may be reconfigured from Wi-Fi control frames RTS, CTS, and/or CTS-to-self formatted to operate according to a legacy Wi-Fi 802.11 implementation to allow for improved detection of a channel reservation and channel reservation response transmissions.

For example, RA field 820-a (or RA field 820-b) may be configured to include multiple fields, such as a base station ID 825, a UE ID 830, a payload 835, and/or a base station transmit flag 840. In some cases, the payload 835 may include priority information, CSI, or a tolerated interference indicator. This configuration may allow for other wireless nodes (e.g., another base station 105, or a UE 115, etc.) to identify channel reservation and channel reservation response transmissions that it has received.

Figure 9:
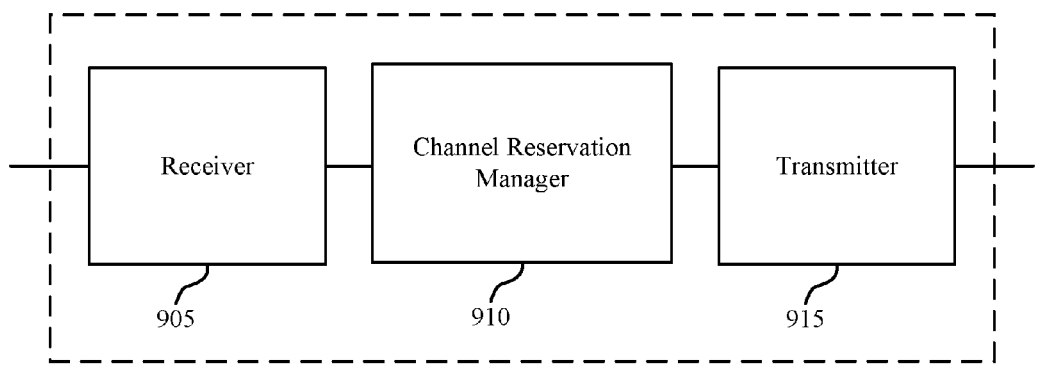
FIGS. 9 through 11 show diagrams of a wireless device that supports channel reservation techniques for unlicensed spectrum in accordance with aspects of the present disclosure.

FIG. 9 shows a diagram of a wireless device 900 that supports channel reservation techniques for unlicensed spectrum in accordance with aspects of the present disclosure. Wireless device 900 may be an example of aspects of a base station 105 described with reference to FIGS. 1 and 2. Wireless device 900 may include receiver 905, channel reservation manager 910 and transmitter 915. Wireless device 900 may also include a processor. Each of these components may be in communication with each other.

The receiver 905 may receive information such as packets, user data, or control information associated with various information channels (e.g., control channels, data channels, information related to channel reservation techniques for unlicensed spectrum, etc.). Information may be passed on to other components of the device. The receiver 905 may be an example of aspects of the transceiver 1225 described with reference to FIG. 12.

The channel reservation manager 910 may identify a transmission opportunity duration for a transmission, determine an allocation between DL transmissions and UL transmissions for the identified transmission opportunity duration, and broadcast, in an unlicensed RF spectrum band, a channel reservation transmission indicating the identified transmission opportunity duration and the determined allocation. The channel reservation manager 910 may also be an example of aspects of the channel reservation manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
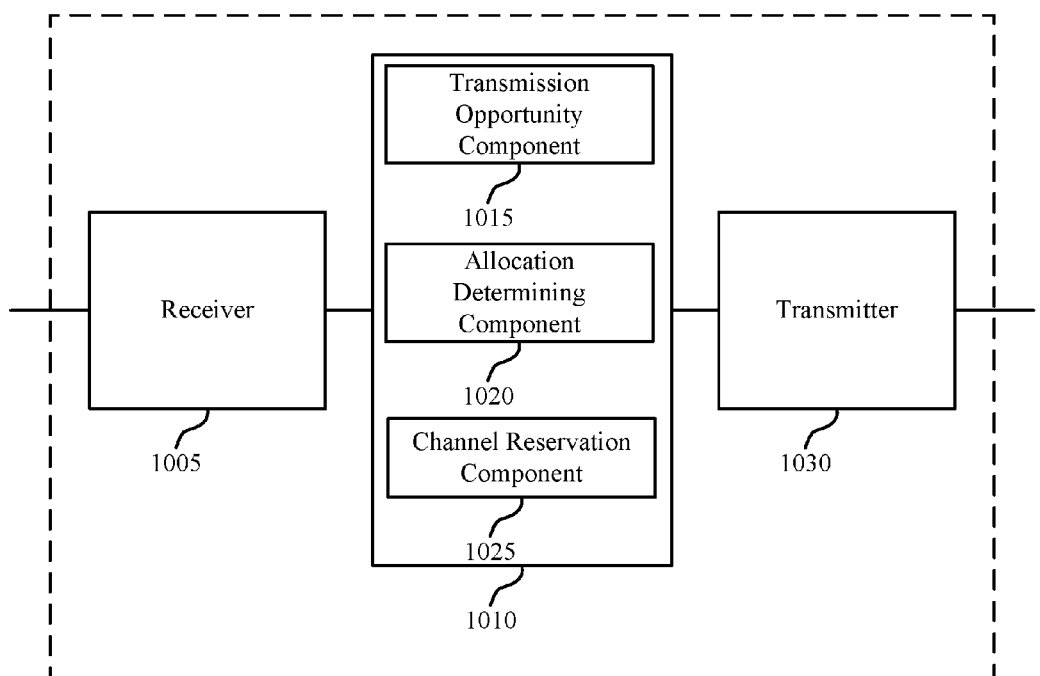

FIG. 10 shows a diagram of a wireless device 1000 that supports channel reservation techniques for unlicensed spectrum in accordance with aspects of the present disclosure. Wireless device 1000 may be an example of aspects of a wireless device 900 or a base station 105 described with reference to FIGS. 1, 2 and 9. Wireless device 1000 may include receiver 1005, channel reservation manager 1010 and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The channel reservation manager 1010 may be an example of aspects of channel reservation manager 910 described with reference to FIG. 9. The channel reservation manager 1010 may include transmission opportunity component 1015, allocation determining component 1020 and channel reservation component 1025. The channel reservation manager 1010 may be an example of aspects of the channel reservation manager 1205 described with reference to FIG. 12. The transmission opportunity component 1015 may identify a transmission opportunity duration for a transmission.

The allocation determining component 1020 may determine an allocation between DL transmissions and UL transmissions for the identified transmission opportunity duration. In some cases, the determined allocation of DL transmissions is for a first set of users and the determined allocation of UL transmissions is for a second set of users, where one or more of the first set of users is different than one or more of the second set of users.

The channel reservation component 1025 may broadcast, in an unlicensed RF spectrum band, a channel reservation transmission indicating the identified transmission opportunity duration and the determined allocation. In some cases, broadcasting the channel reservation transmission comprises broadcasting the channel reservation transmission across multiple sub-bands of a channel. In some cases, the channel reservation transmission has a field format of one or both of a Wi-Fi RTS transmission, a Wi-Fi CTS transmission, or a Wi-Fi CTS-to-self transmission, including a RA field, and the identified transmission opportunity duration and the determined allocation are included in the RA field. In some cases, the channel reservation transmission comprises a Wi-Fi CTS-to-self transmission and a PDCCH, and an interference threshold indicator is carried by one or both of the Wi-Fi CTS-to-self transmission and the PDCCH. In some cases, the interference threshold indicator and a PFFICH payload are carried by the Wi-Fi CTS-to-self transmission. In some cases, the PDCCH is a broadcast PDCCH that carries the interference threshold indicator.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize a plurality of antennas.

Figure 11:
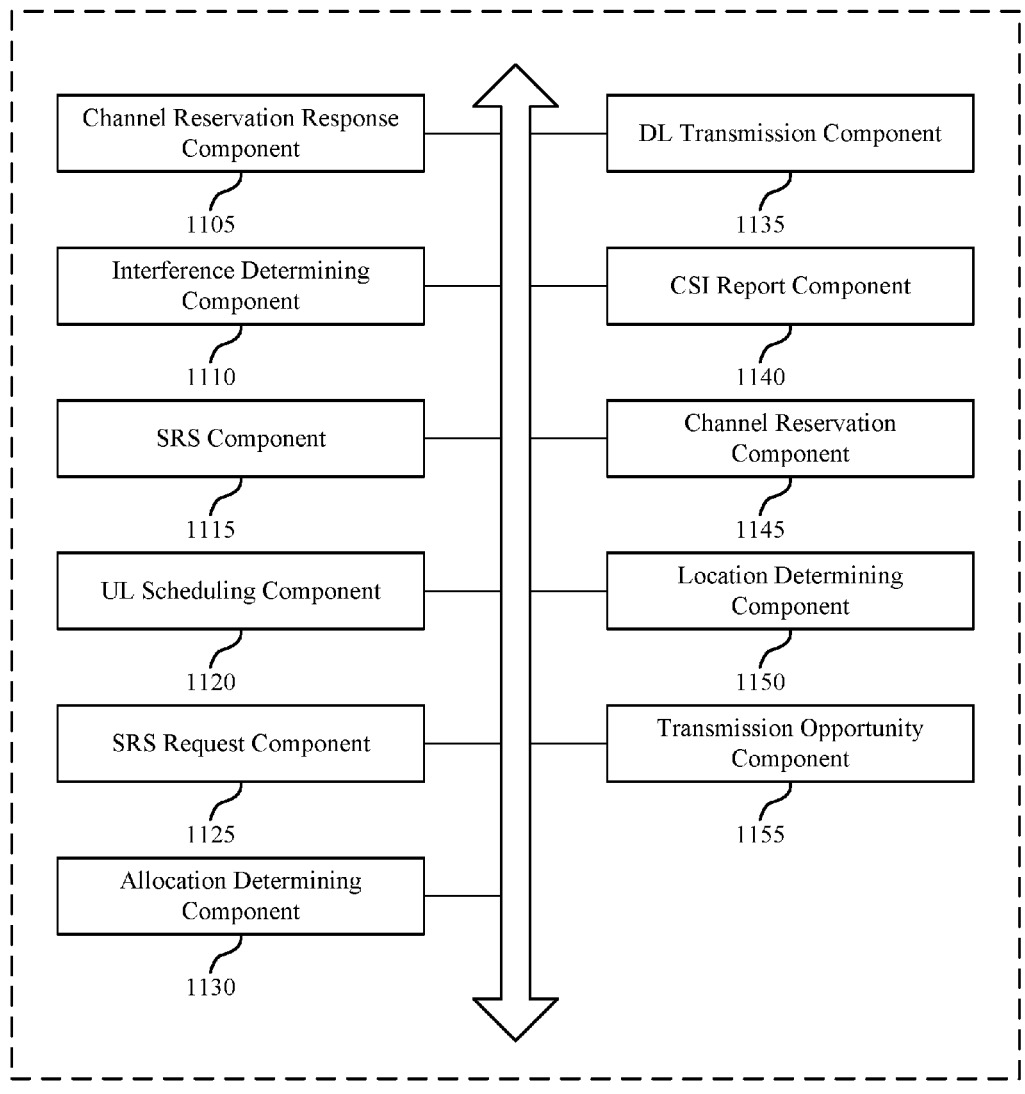

FIG. 11 shows a diagram of a channel reservation manager 1100, which may be an example of the corresponding component of wireless device 900 or wireless device 1000, in accordance with aspects of the present disclosure. That is, channel reservation manager 1100 may be an example of aspects of channel reservation manager 910 or channel reservation manager 1010 described with reference to FIGS. 9 and 10. The channel reservation manager 1100 may also be an example of aspects of the channel reservation manager 1205 described with reference to FIG. 12.

The channel reservation manager 1100 may include channel reservation response component 1105, interference determining component 1110, SRS component 1115, UL scheduling component 1120, SRS request component 1125, allocation determining component 1130, DL transmission component 1135, CSI report component 1140, channel reservation component 1145, location determining component 1150 and transmission opportunity component 1155. Each of these modules may communicate, directly or indirectly, with one another (e.g., via one or more buses).

The channel reservation response component 1105 may receive a channel reservation response transmission comprising an interference threshold indicator associated with a UE, receive a channel reservation response transmission comprising a Tx ID from a UE, detect a channel reservation response transmission from a UE of a different operator, and receive a channel reservation response transmission comprising a CSI report, where the channel reservation transmission comprises a CSI request.

The interference determining component 1110 may determine interference caused at the UE based on the received Tx ID.

The SRS component 1115 may receive an SRS. The UL scheduling component 1120 may schedule UL transmissions based on the received SRS.

The SRS request component 1125 may transmit an SRS request in the channel reservation transmission, where the SRS is received before a DL transmission associated with the channel reservation transmission, and transmit an SRS request along with a DL grant for DL transmissions associated with the channel reservation transmission, where the SRS is received after the DL transmissions.

The allocation determining component 1130 may determine an allocation between DL transmissions and UL transmissions for the identified transmission opportunity duration. In some cases, the determined allocation of DL transmissions is for a first set of users and the determined allocation of UL transmissions is for a second set of users, where one or more of the first set of users is different than one or more of the second set of users.

The DL transmission component 1135 may transmit a first DL transmission during the first portion of the transmission opportunity duration based on the first CSI report, and transmit a second DL transmission during the second portion of the transmission opportunity duration based on the second CSI report.

The CSI report component 1140 may receive a first CSI report associated with a first portion of the transmission opportunity duration, receive a second CSI report associated with a second portion of the transmission opportunity duration, receive the first CSI report in a first channel reservation response transmission, and receive the second CSI report in a second channel reservation response transmission.

The channel reservation component 1145 may broadcast, in an unlicensed RF spectrum band, a channel reservation transmission indicating the identified transmission opportunity duration and the determined allocation. In some cases, broadcasting the channel reservation transmission comprises broadcasting the channel reservation transmission across multiple sub-bands of a channel. In some cases, the channel reservation transmission has a field format of one or both of a Wi-Fi RTS transmission, a Wi-Fi CTS transmission, or a Wi-Fi CTS-to-self transmission, including a RA field, and the identified transmission opportunity duration and the determined allocation are included in the RA field. In some cases, the channel reservation transmission comprises a Wi-Fi CTS-to-self transmission and a PDCCH, and an interference threshold indicator is carried by one or both of the Wi-Fi CTS-to-self transmission and the PDCCH. In some cases, the interference threshold indicator and a PFFICH payload are carried by the Wi-Fi CTS-to-self transmission. In some cases, the PDCCH is a broadcast PDCCH that carries the interference threshold indicator.

The location determining component 1150 may determine a location of the UE of the different operator based on the detected channel reservation response transmission. The transmission opportunity component 1155 may identify a transmission opportunity duration for a transmission.

Figure 12:
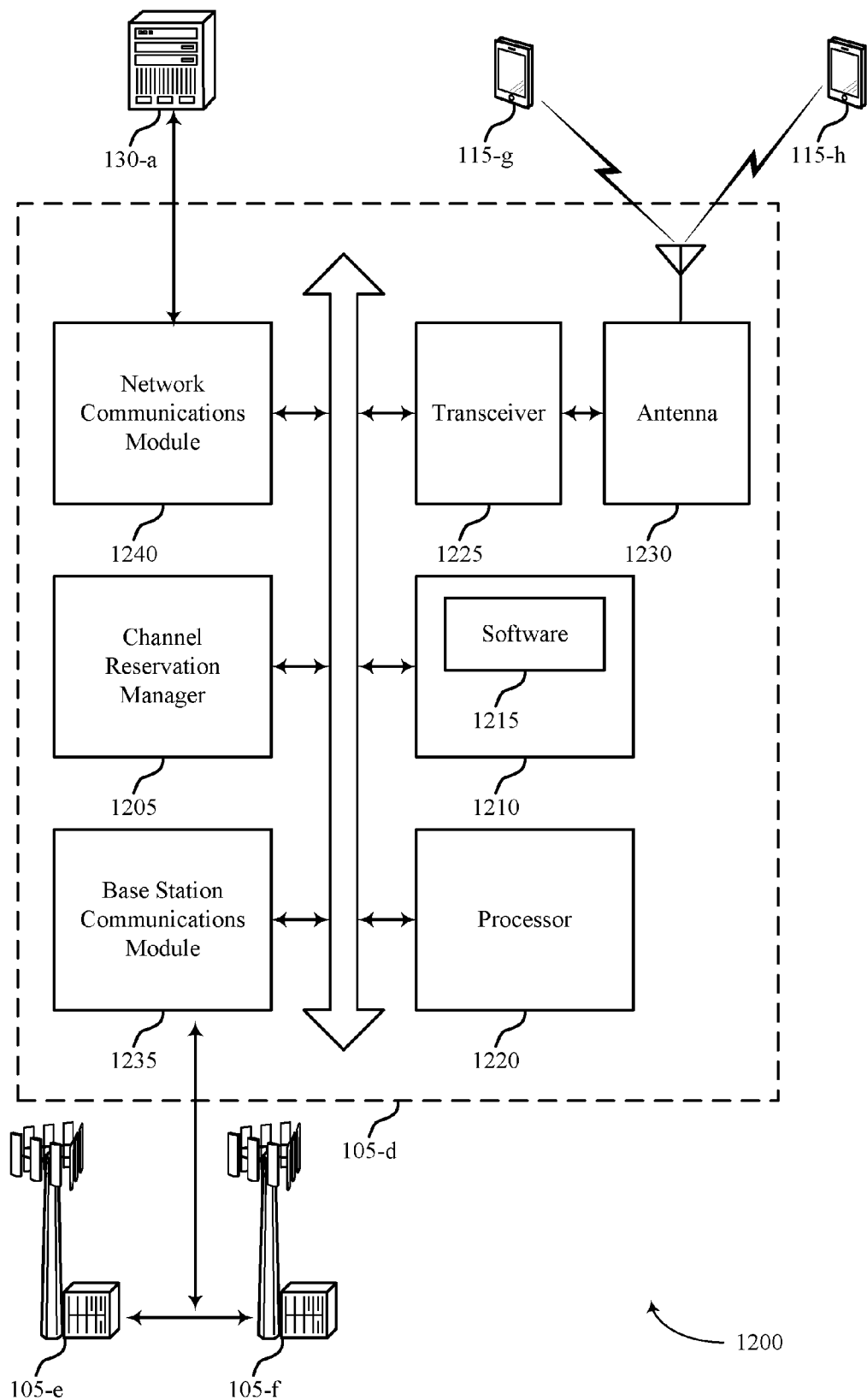
FIG. 12 illustrates a diagram of a system including a base station that supports channel reservation techniques for unlicensed spectrum in accordance with aspects of the present disclosure.

FIG. 12 shows a diagram of a wireless system 1200 including a device configured that supports channel reservation techniques for unlicensed spectrum in accordance with aspects of the present disclosure. For example, wireless system 1200 may include base station 105-d, which may be an example of a wireless device 900, a wireless device 1000, or a base station 105 as described with reference to FIGS. 1, 2 and 9 through 11. Base station 105-d may also include components for bi-directional voice and data communications including components for transmitting communications and components for receiving communications. For example, base station 105-d may communicate bi-directionally with one or more UEs 115.

Base station 105-d may also include channel reservation manager 1205, memory 1210, processor 1220, transceiver 1225, antenna 1230, base station communications module 1235 and network communications module 1240. Each of these modules may communicate, directly or indirectly, with one another (e.g., via one or more buses). The channel reservation manager 1205 may be an example of a channel reservation manager as described with reference to FIGS. 9 through 11.

The memory 1210 may include random access memory (RAM) and read only memory (ROM). The memory 1210 may store computer-readable, computer-executable software including instructions that, when executed, cause the processor to perform various functions described herein (e.g., channel reservation techniques for unlicensed spectrum, etc.). In some cases, the software 1215 may not be directly executable by the processor but may cause a computer (e.g., when compiled and executed) to perform functions described herein. The processor 1220 may include an intelligent hardware device, (e.g., a central processing unit (CPU), a microcontroller, an application specific integrated circuit (ASIC), etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

The base station communications module 1235 may manage communications with other base station 105, and may include a controller or scheduler for controlling communications with UEs 115 in cooperation with other base stations 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network (e.g., via one or more wired backhaul links). For example, the network communications module 1240 may manage the transfer of data communications for client devices, such as one or more UEs 115.

Figure 13:
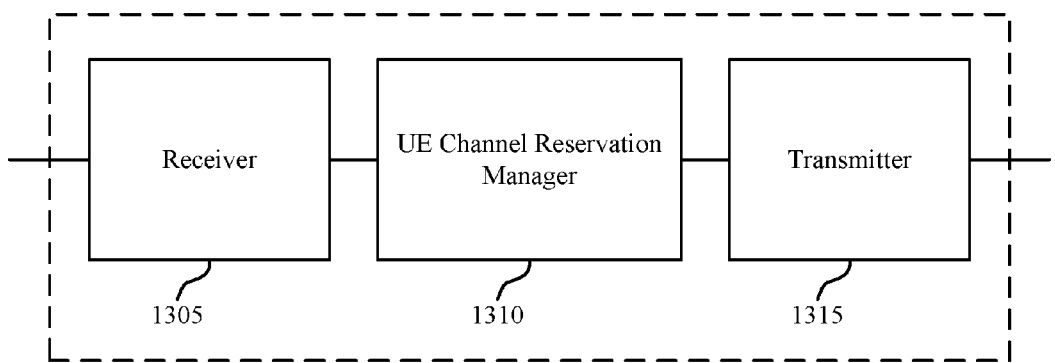
FIGS. 13 through 15 show diagrams of a wireless device that supports channel reservation techniques for unlicensed spectrum in accordance with aspects of the present disclosure.

FIG. 13 shows a diagram of a wireless device 1300 that supports channel reservation techniques for unlicensed spectrum in accordance with aspects of the present disclosure. Wireless device 1300 may be an example of aspects of a UE 115 described with reference to FIGS. 1 and 2. Wireless device 1300 may include receiver 1305, UE channel reservation manager 1310 and transmitter 1315. Wireless device 1300 may also include a processor. Each of these components may be in communication with each other.

The receiver 1305 may receive information such as packets, user data, or control information associated with various information channels (e.g., control channels, data channels, information related to channel reservation techniques for unlicensed spectrum, etc.). Information may be passed on to other components of the device. The receiver 1305 may be an example of aspects of the transceiver 1625 described with reference to FIG. 16.

The UE channel reservation manager 1310 may receive, in an unlicensed RF spectrum band, a channel reservation transmission indicating a transmission opportunity and an allocation of DL transmissions and UL transmissions, determine CSI associated with the transmission opportunity, and transmit a CSI report in a channel reservation response transmission. The UE channel reservation manager 1310 may also be an example of aspects of the UE channel reservation manager 1605 described with reference to FIG. 16.

The transmitter 1315 may transmit signals received from other components of wireless device 1300. In some examples, the transmitter 1315 may be collocated with a receiver in a transceiver module. For example, the transmitter 1315 may be an example of aspects of the transceiver 1625 described with reference to FIG. 16. The transmitter 1315 may include a single antenna, or it may include a plurality of antennas.

Figure 14:
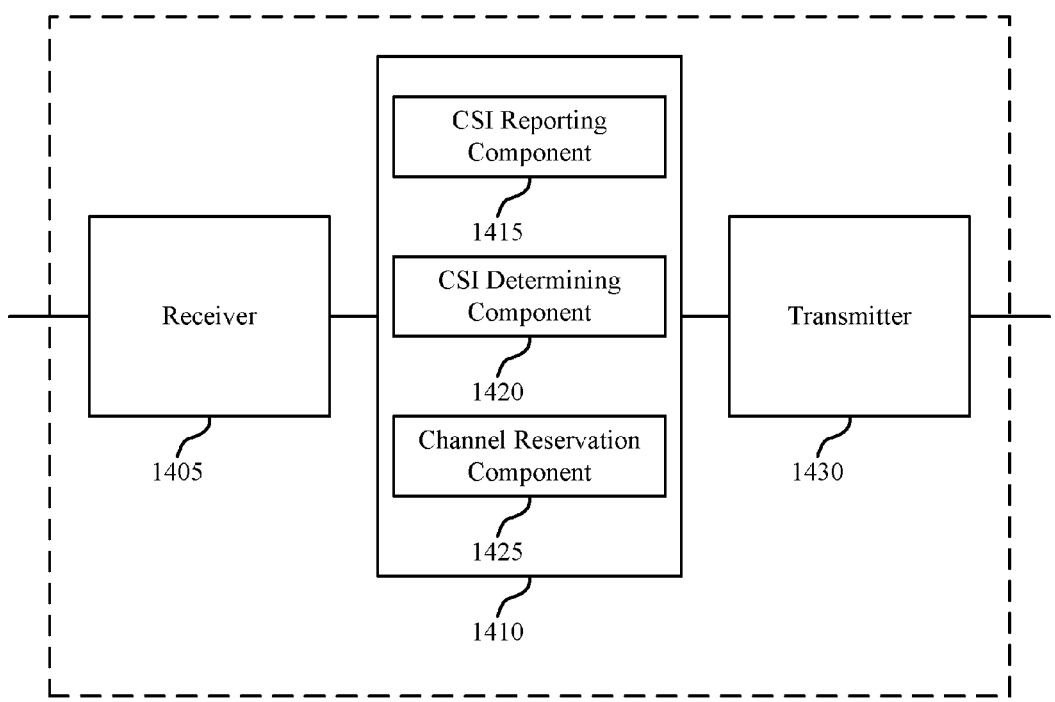

FIG. 14 shows a diagram of a wireless device 1400 that supports channel reservation techniques for unlicensed spectrum in accordance with aspects of the present disclosure. Wireless device 1400 may be an example of aspects of a wireless device 1300 or a UE 115 described with reference to FIGS. 1, 2 and 13. Wireless device 1400 may include receiver 1405, UE channel reservation manager 1410 and transmitter 1430. Wireless device 1400 may also include a processor. Each of these components may be in communication with each other.

The receiver 1405 may receive information which may be passed on to other components of the device. The receiver 1405 may also perform the functions described with reference to the receiver 1305 of FIG. 13. The receiver 1405 may be an example of aspects of the transceiver 1625 described with reference to FIG. 16.

The UE channel reservation manager 1410 may be an example of aspects of UE channel reservation manager 1310 described with reference to FIG. 13. The UE channel reservation manager 1410 may include CSI reporting component 1415, CSI determining component 1420 and channel reservation component 1425. The UE channel reservation manager 1410 may be an example of aspects of the UE channel reservation manager 1605 described with reference to FIG. 16.

The CSI reporting component 1415 may transmit a CSI report in a channel reservation response transmission, and transmit the channel reservation response transmission across multiple sub-bands of a channel using a Wi-Fi waveform, or format. In some cases, transmitting the CSI report in the channel reservation response transmission comprises transmitting the CSI report in a PUCCH in the channel reservation response transmission, where the Wi-Fi CTS transmission carries an interference threshold indicator. In some cases, transmitting the CSI report in the channel reservation response transmission comprises transmitting the CSI report in a first PUCCH in the channel reservation response transmission. In some cases, the CSI report is frequency domain multiplexed across the channel reservation response transmission in multiple sub-bands of the channel.

The CSI determining component 1420 may determine CSI associated with the transmission opportunity. The channel reservation component 1425 may receive, in an unlicensed RF spectrum band, a channel reservation transmission indicating a transmission opportunity and an allocation of DL transmissions and UL transmissions. In some cases, the channel reservation transmission comprises a CSI request.

The transmitter 1430 may transmit signals received from other components of wireless device 1400. In some examples, the transmitter 1430 may be collocated with a receiver in a transceiver module. For example, the transmitter 1430 may be an example of aspects of the transceiver 1625 described with reference to FIG. 16. The transmitter 1430 may utilize a single antenna, or it may utilize a plurality of antennas.

Figure 15:
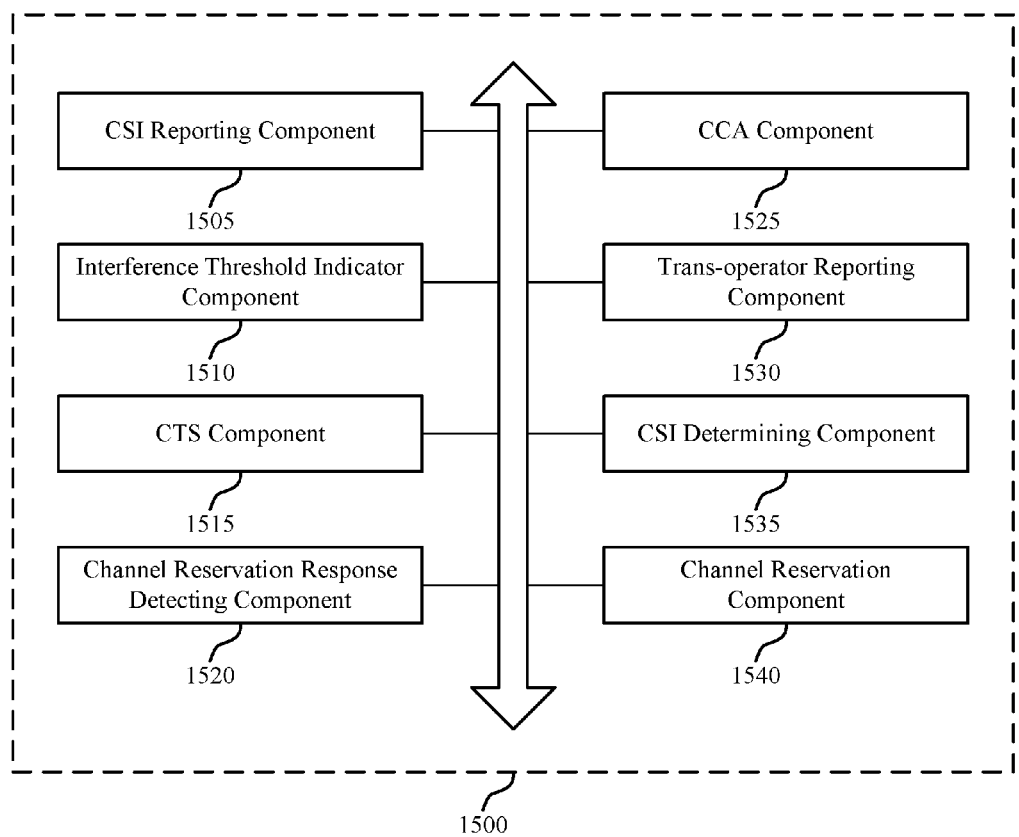

FIG. 15 shows a diagram of a UE channel reservation manager 1500, which may be an example of the corresponding component of wireless device 1300 or wireless device 1400, in accordance with aspects of the present disclosure. That is, UE channel reservation manager 1500 may be an example of aspects of UE channel reservation manager 1310 or UE channel reservation manager 1410 described with reference to FIGS. 13 and 14. The UE channel reservation manager 1500 may also be an example of aspects of the UE channel reservation manager 1605 described with reference to FIG. 16.

The UE channel reservation manager 1500 may include CSI reporting component 1505, interference threshold indicator component 1510, CTS component 1515, channel reservation response detecting component 1520, CCA component 1525, trans-operator reporting component 1530, CSI determining component 1535 and channel reservation component 1540. Each of these modules may communicate, directly or indirectly, with one another (e.g., via one or more buses).

The CSI reporting component 1505 may transmit a CSI report in a channel reservation response transmission, and transmit the channel reservation response transmission across multiple sub-bands of a channel using a Wi-Fi waveform. In some cases, transmitting the CSI report in the channel reservation response transmission comprises transmitting the CSI report in a PUCCH in the channel reservation response transmission, where the Wi-Fi CTS transmission carries an interference threshold indicator. In some cases, transmitting the CSI report in the channel reservation response transmission comprises transmitting the CSI report in a first PUCCH in the channel reservation response transmission. In some cases, the CSI report is frequency domain multiplexed across the channel reservation response transmission in multiple sub-bands of the channel.

The interference threshold indicator component 1510 may transmit an interference threshold indicator in a second PUCCH in the channel reservation response transmission. The CTS component 1515 may transmit a Wi-Fi CTS transmission in the channel reservation response transmission.

The channel reservation response detecting component 1520 may detect a second channel reservation response transmission from one or more UEs of a different operator or one or more wireless nodes. The CCA component 1525 may perform a CCA procedure, determine that the CCA procedure has failed, and refrain from transmitting based on the failed CCA procedure.

The trans-operator reporting component 1530 may report one or both of a DMRS and a beacon measurement for one or more base stations of a different operator. The CSI determining component 1535 may determine CSI associated with the transmission opportunity.

The channel reservation component 1540 may receive, in an unlicensed RF spectrum band, a channel reservation transmission indicating a transmission opportunity and an allocation of DL transmissions and UL transmissions. In some cases, the channel reservation transmission comprises a CSI request.

Figure 16:
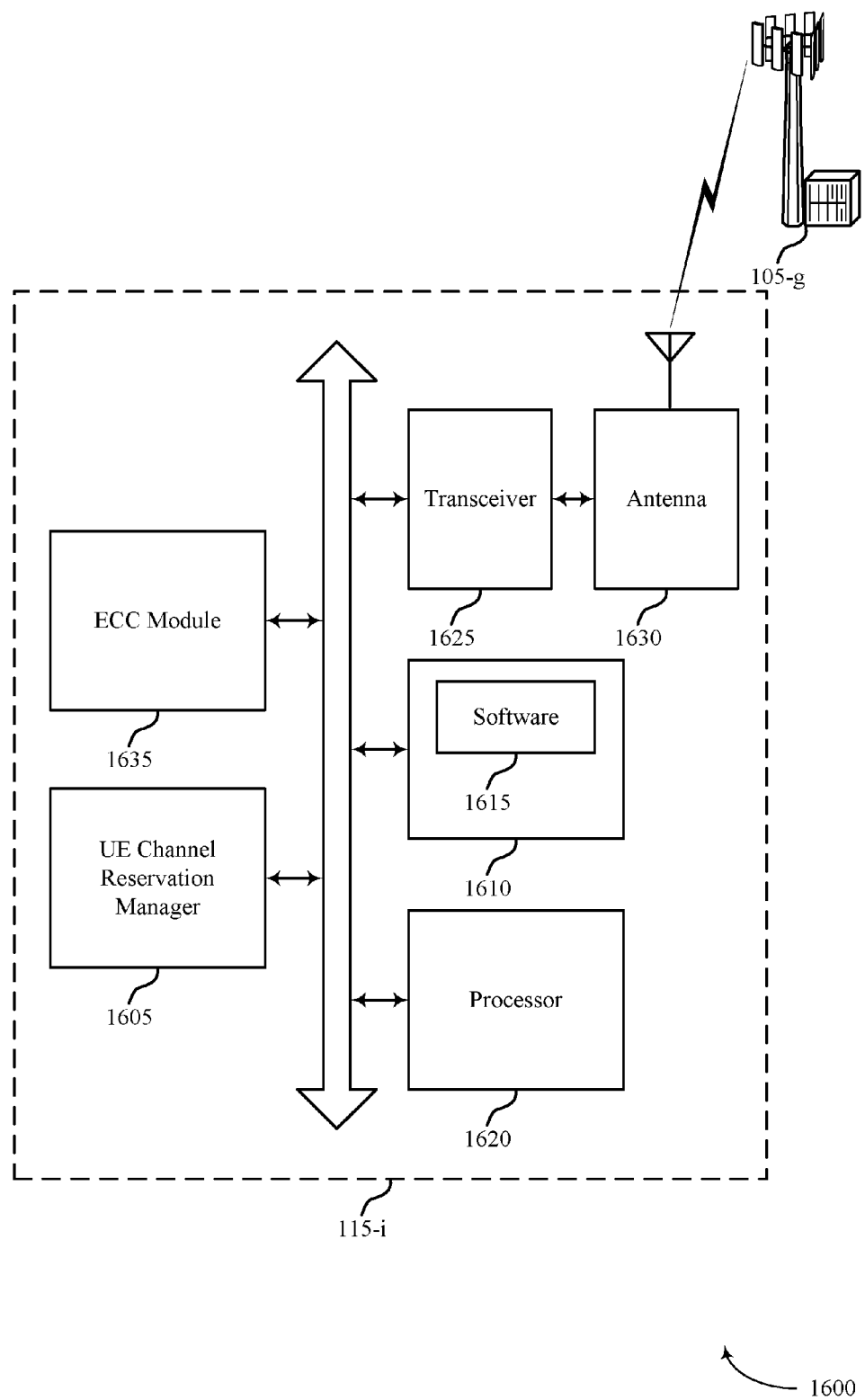
FIG. 16 illustrates a diagram of a system including a UE that supports channel reservation techniques for unlicensed spectrum in accordance with aspects of the present disclosure.

FIG. 16 shows a diagram of a system 1600 including a device that supports channel reservation techniques for unlicensed spectrum in accordance with aspects of the present disclosure. For example, system 1600 may include UE 115-*g*, which may be an example of a wireless device 1300, a wireless device 1400, or a UE 115 as described with reference to FIGS. 1, 2 and 13 through 15.

UE 115-*g* may also include UE channel reservation manager 1605, memory 1610, processor 1620, transceiver 1625, antenna 1630 and ECC module 1635. Each of these modules may communicate, directly or indirectly, with one another (e.g., via one or more buses). The UE channel reservation manager 1605 may be an example of a UE channel reservation manager as described with reference to FIGS. 13 through 15.

The memory 1610 may include RAM and ROM. The memory 1610 may store computer-readable, computer-executable software including instructions that, when executed, cause the processor to perform various functions described herein (e.g., channel reservation techniques for unlicensed spectrum, etc.). In some cases, the software 1615 may not be directly executable by the processor but may cause a computer (e.g., when compiled and executed) to perform functions described herein. The processor 1620 may include an intelligent hardware device (e.g., a CPU, a microcontroller, an ASIC, etc.).

The transceiver 1625 may communicate bi-directionally, via one or more antennas, wired, or wireless links, with one or more networks, as described above. For example, the transceiver 1625 may communicate bi-directionally with a base station 105 or a UE 115. The transceiver 1625 may also include a modem to modulate the packets and provide the modulated packets to the antennas for transmission, and to demodulate packets received from the antennas. In some cases, the wireless device may include a single antenna 1630. However, in some cases the device may have more than one antenna 1230, which may be capable of concurrently transmitting or receiving multiple wireless transmissions.

The ECC module 1635 may enable operations using enhanced component carriers (eCCs) such as communication using shared or unlicensed spectrum, using reduced TTIs or subframe durations, or using a large number of component carriers.

Figure 17:
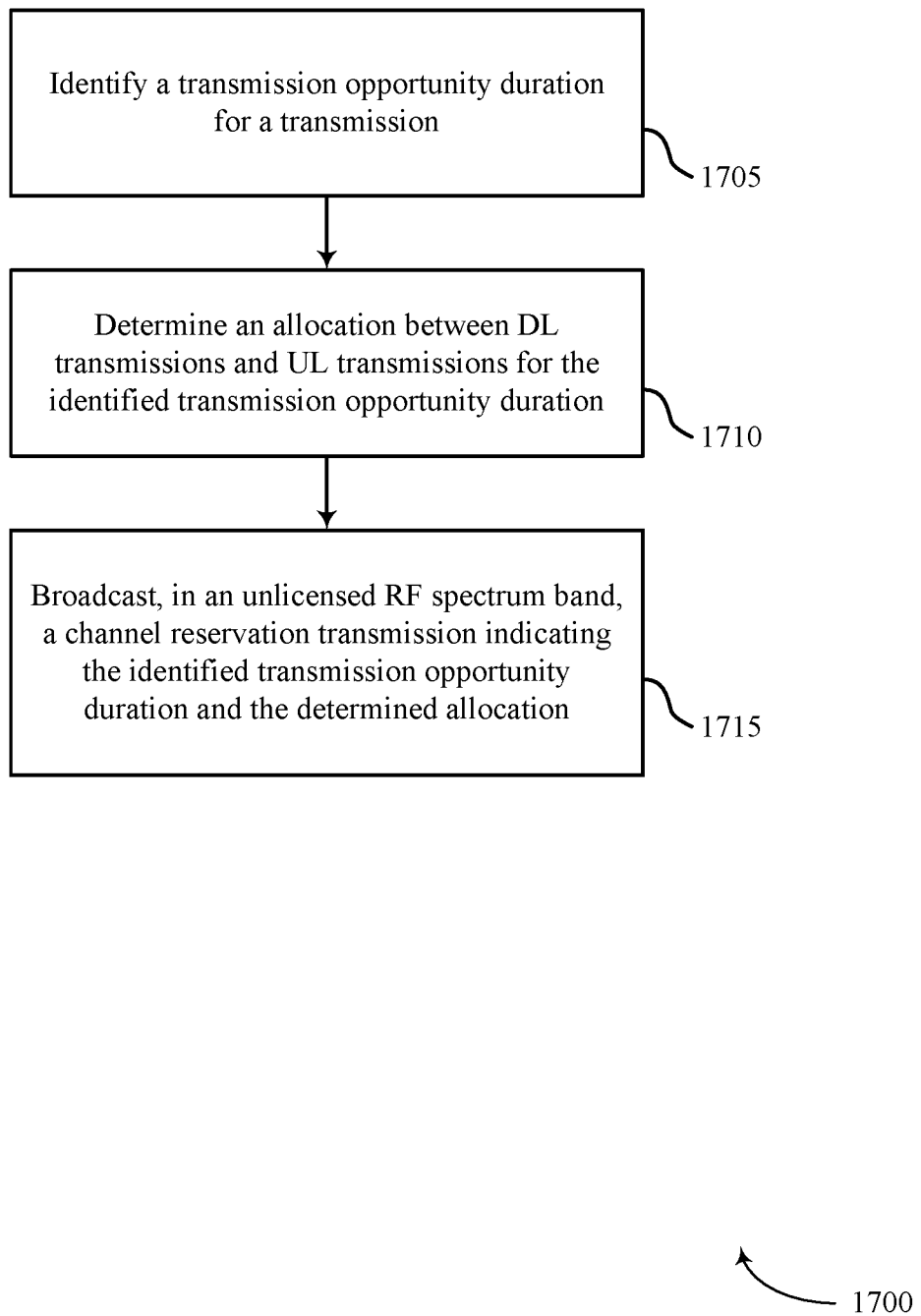
FIGS. 17 through 22 illustrate methods for channel reservation techniques for unlicensed spectrum in accordance with aspects of the present disclosure.

FIG. 17 shows a flowchart illustrating a method 1700 for channel reservation techniques for unlicensed spectrum in accordance with aspects of the present disclosure. The operations of method 1700 may be implemented by a device such as a base station 105 or its components as described with reference to FIGS. 1 and 2. For example, the operations of method 1700 may be performed by the channel reservation manager as described herein. In some examples, the base station 105 may execute a set of codes to control the functional elements of the device to perform the functions described below. Additionally or alternatively, the base station 105 may perform aspects of the functions described below using special-purpose hardware.

At block 1705, the base station 105 may identify a transmission opportunity duration for a transmission as described above with reference to FIGS. 2 through 8. In certain examples, the operations of block 1705 may be performed by the transmission opportunity component as described with reference to FIGS. 10 and 11.

At block 1710, the base station 105 may determine an allocation between DL transmissions and UL transmissions for the identified transmission opportunity duration as described above with reference to FIGS. 2 through 8. In certain examples, the operations of block 1710 may be performed by the allocation determining component as described with reference to FIGS. 10 and 11.

At block 1715, the base station 105 may broadcast, in an unlicensed RF spectrum band, a channel reservation transmission indicating the identified transmission opportunity duration and the determined allocation as described above with reference to FIGS. 2 through 8. In certain examples, the operations of block 1715 may be performed by the channel reservation component as described with reference to FIGS. 10 and 11.

Figure 18:
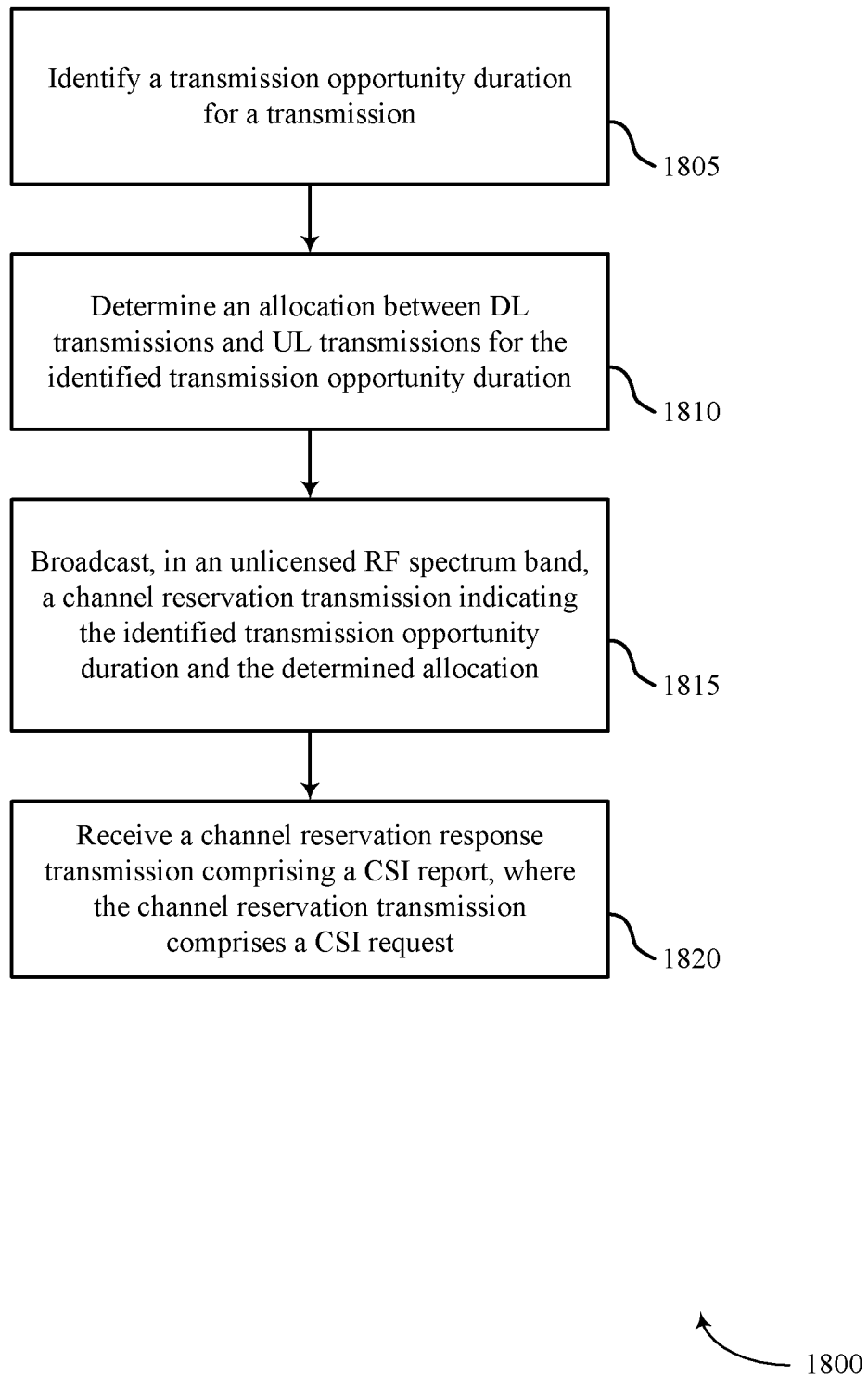

FIG. 18 shows a flowchart illustrating a method 1800 for channel reservation techniques for unlicensed spectrum in accordance with aspects of the present disclosure. The operations of method 1800 may be implemented by a device such as a base station 105 or its components as described with reference to FIGS. 1 and 2. For example, the operations of method 1800 may be performed by the channel reservation manager as described herein. In some examples, the base station 105 may execute a set of codes to control the functional elements of the device to perform the functions described below. Additionally or alternatively, the base station 105 may perform aspects of the functions described below using special-purpose hardware.

At block 1805, the base station 105 may identify a transmission opportunity duration for a transmission as described above with reference to FIGS. 2 through 8. In certain examples, the operations of block 1805 may be performed by the transmission opportunity component as described with reference to FIGS. 10 and 11.

At block 1810, the base station 105 may determine an allocation between DL transmissions and UL transmissions for the identified transmission opportunity duration as described above with reference to FIGS. 2 through 8. In certain examples, the operations of block 1810 may be performed by the allocation determining component as described with reference to FIGS. 10 and 11.

At block 1815, the base station 105 may broadcast, in an unlicensed RF spectrum band, a channel reservation transmission indicating the identified transmission opportunity duration and the determined allocation as described above with reference to FIGS. 2 through 8. In certain examples, the operations of block 1815 may be performed by the channel reservation component as described with reference to FIGS. 10 and 11.

At block 1820, the base station 105 may receive a channel reservation response transmission comprising a CSI report, where the channel reservation transmission comprises a CSI request as described above with reference to FIGS. 2 through 8. In certain examples, the operations of block 1820 may be performed by the channel reservation response component as described with reference to FIGS. 10 and 11.

Figure 19:
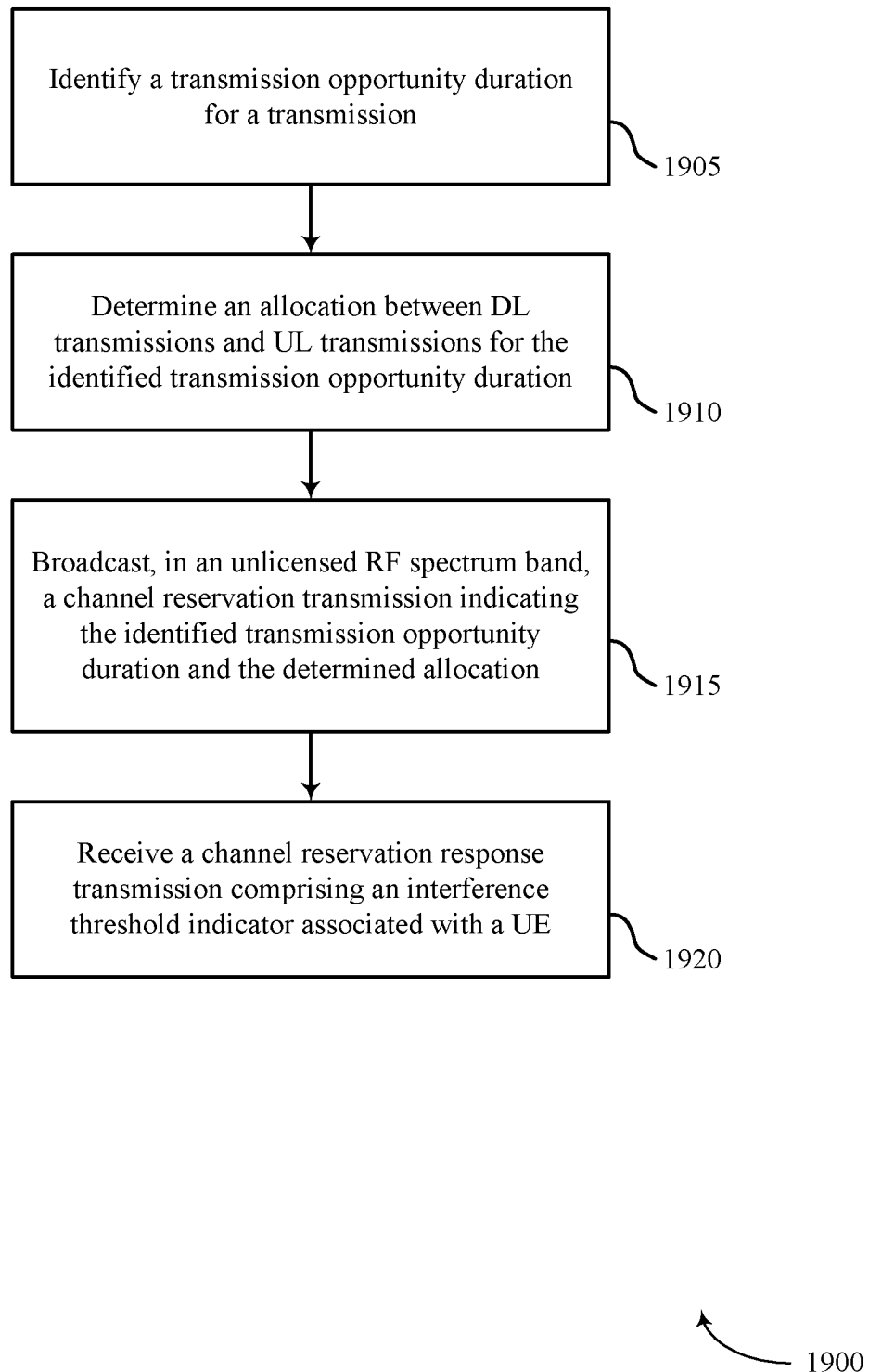

FIG. 19 shows a flowchart illustrating a method 1900 for channel reservation techniques for unlicensed spectrum in accordance with aspects of the present disclosure. The operations of method 1900 may be implemented by a device such as a base station 105 or its components as described with reference to FIGS. 1 and 2. For example, the operations of method 1900 may be performed by the channel reservation manager as described herein. In some examples, the base station 105 may execute a set of codes to control the functional elements of the device to perform the functions described below. Additionally or alternatively, the base station 105 may perform aspects of the functions described below using special-purpose hardware.

At block 1905, the base station 105 may identify a transmission opportunity duration for a transmission as described above with reference to FIGS. 2 through 8. In certain examples, the operations of block 1905 may be performed by the transmission opportunity component as described with reference to FIGS. 10 and 11.

At block 1910, the base station 105 may determine an allocation between DL transmissions and UL transmissions for the identified transmission opportunity duration as described above with reference to FIGS. 2 through 8. In certain examples, the operations of block 1910 may be performed by the allocation determining component as described with reference to FIGS. 10 and 11.

At block 1915, the base station 105 may broadcast, in an unlicensed RF spectrum band, a channel reservation transmission indicating the identified transmission opportunity duration and the determined allocation as described above with reference to FIGS. 2 through 8. In certain examples, the operations of block 1915 may be performed by the channel reservation component as described with reference to FIGS. 10 and 11.

At block 1920, the base station 105 may receive a channel reservation response transmission comprising an interference threshold indicator associated with a UE as described above with reference to FIGS. 2 through 8. In certain examples, the operations of block 1920 may be performed by the channel reservation response component as described with reference to FIGS. 10 and 11.

Figure 20:
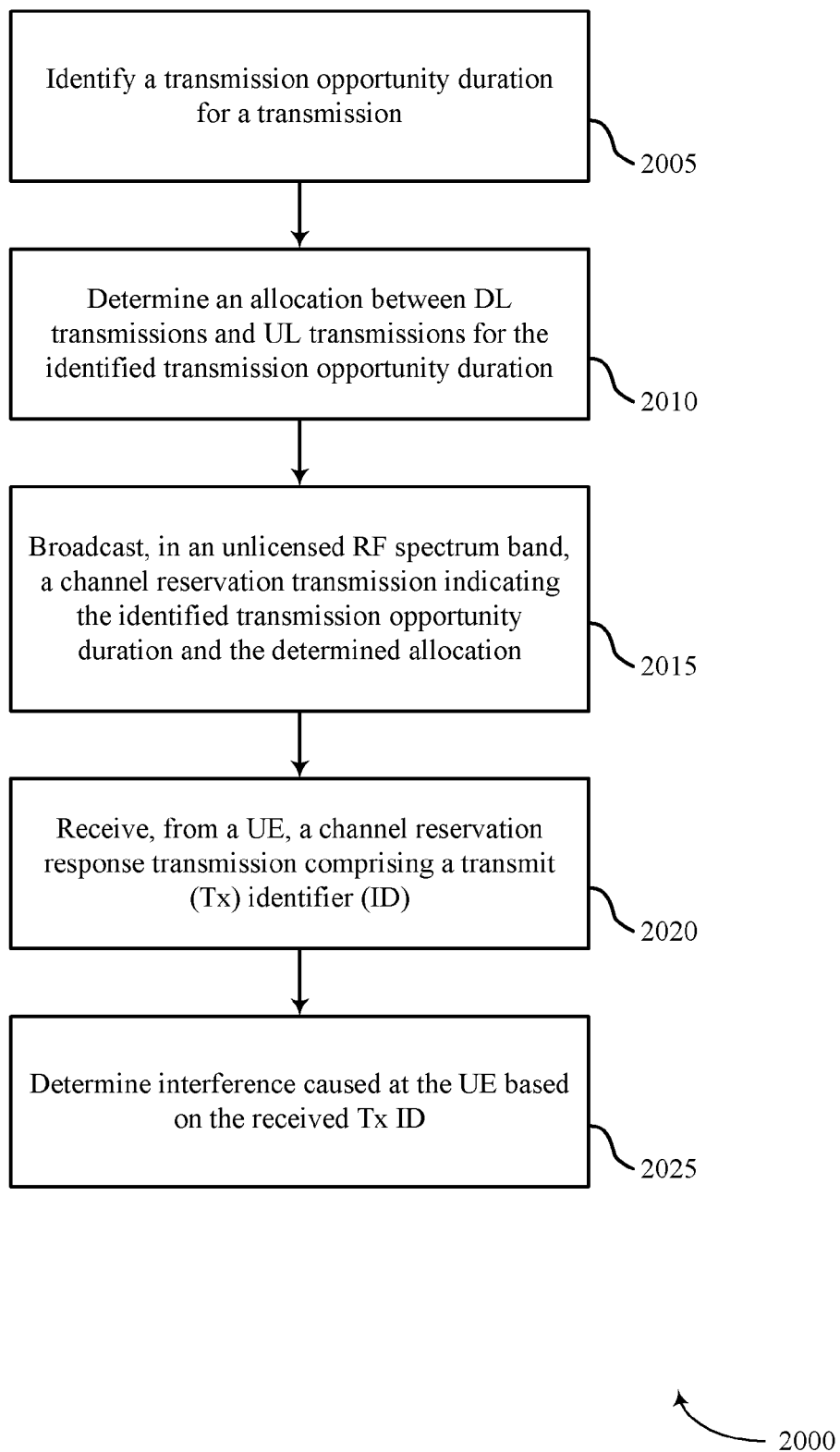

FIG. 20 shows a flowchart illustrating a method 2000 for channel reservation techniques for unlicensed spectrum in accordance with aspects of the present disclosure. The operations of method 2000 may be implemented by a device such as a base station 105 or its components as described with reference to FIGS. 1 and 2. For example, the operations of method 2000 may be performed by the channel reservation manager as described herein. In some examples, the base station 105 may execute a set of codes to control the functional elements of the device to perform the functions described below. Additionally or alternatively, the base station 105 may perform aspects of the functions described below using special-purpose hardware.

At block 2005, the base station 105 may identify a transmission opportunity duration for a transmission as described above with reference to FIGS. 2 through 8. In certain examples, the operations of block 2005 may be performed by the transmission opportunity component as described with reference to FIGS. 10 and 11.

At block 2010, the base station 105 may determine an allocation between DL transmissions and UL transmissions for the identified transmission opportunity duration as described above with reference to FIGS. 2 through 8. In certain examples, the operations of block 2010 may be performed by the allocation determining component as described with reference to FIGS. 10 and 11.

At block 2015, the base station 105 may broadcast, in an unlicensed RF spectrum band, a channel reservation transmission indicating the identified transmission opportunity duration and the determined allocation as described above with reference to FIGS. 2 through 8. In certain examples, the operations of block 2015 may be performed by the channel reservation component as described with reference to FIGS. 10 and 11.

At block 2020, the base station 105 may receive, from a UE, a channel reservation response transmission comprising a Tx ID as described above with reference to FIGS. 2 through 8. In certain examples, the operations of block 2020 may be performed by the channel reservation response component as described with reference to FIGS. 10 and 11.

At block 2025, the base station 105 may determine interference caused at the UE based on the received Tx ID as described above with reference to FIGS. 2 through 8. In certain examples, the operations of block 2025 may be performed by the interference determining component as described with reference to FIGS. 10 and 11.

Figure 21:
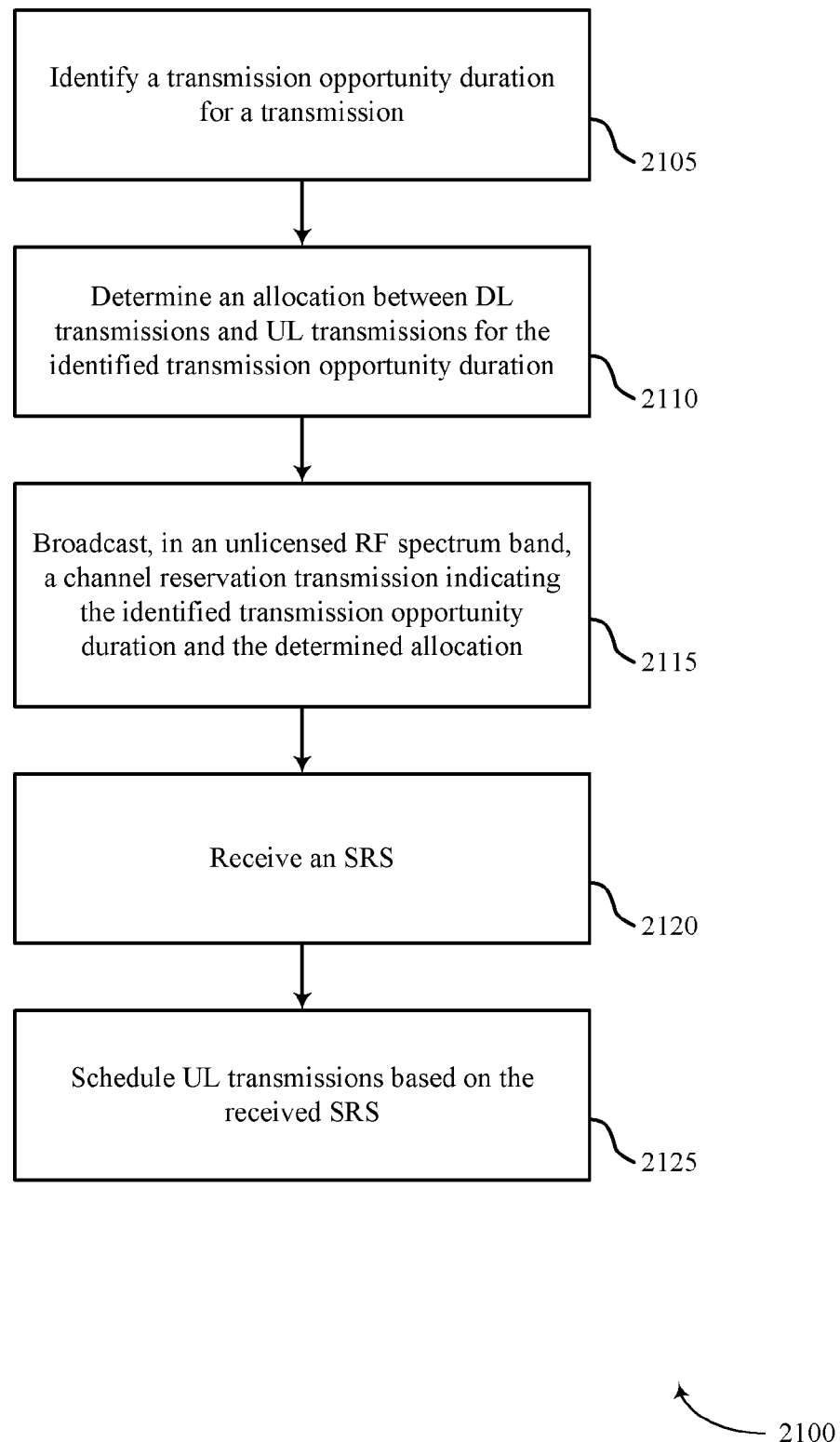

FIG. 21 shows a flowchart illustrating a method 2100 for channel reservation techniques for unlicensed spectrum in accordance with aspects of the present disclosure. The operations of method 2100 may be implemented by a device such as a base station 105 or its components as described with reference to FIGS. 1 and 2. For example, the operations of method 2100 may be performed by the channel reservation manager as described herein. In some examples, the base station 105 may execute a set of codes to control the functional elements of the device to perform the functions described below. Additionally or alternatively, the base station 105 may perform aspects of the functions described below using special-purpose hardware.

At block 2105, the base station 105 may identify a transmission opportunity duration for a transmission as described above with reference to FIGS. 2 through 8. In certain examples, the operations of block 2105 may be performed by the transmission opportunity component as described with reference to FIGS. 10 and 11.

At block 2110, the base station 105 may determine an allocation between DL transmissions and UL transmissions for the identified transmission opportunity duration as described above with reference to FIGS. 2 through 8. In certain examples, the operations of block 2110 may be performed by the allocation determining component as described with reference to FIGS. 10 and 11.

At block 2115, the base station 105 may broadcast, in an unlicensed RF spectrum band, a channel reservation transmission indicating the identified transmission opportunity duration and the determined allocation as described above with reference to FIGS. 2 through 8. In certain examples, the operations of block 2115 may be performed by the channel reservation component as described with reference to FIGS. 10 and 11.

At block 2120, the base station 105 may receive an SRS as described above with reference to FIGS. 2 through 8. In certain examples, the operations of block 2120 may be performed by the SRS component as described with reference to FIGS. 10 and 11.

At block 2125, the base station 105 may schedule UL transmissions based on the received SRS as described above with reference to FIGS. 2 through 8. In certain examples, the operations of block 2125 may be performed by the UL scheduling component as described with reference to FIGS. 10 and 11.

Figure 22:
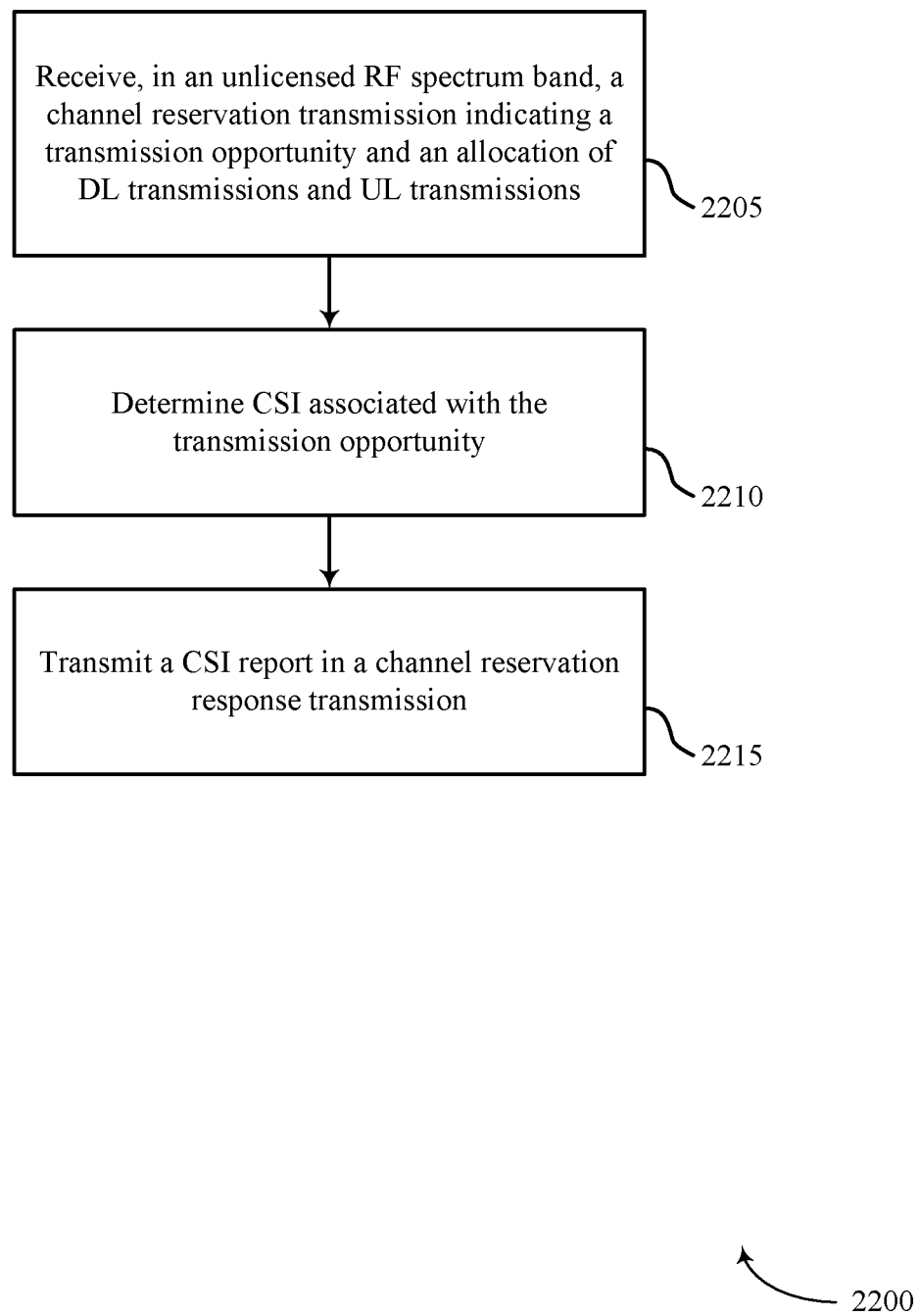

FIG. 22 shows a flowchart illustrating a method 2200 for channel reservation techniques for unlicensed spectrum in accordance with aspects of the present disclosure. The operations of method 2200 may be implemented by a device such as a UE 115 or its components as described with reference to FIGS. 1 and 2. For example, the operations of method 2200 may be performed by the UE channel reservation manager as described herein. In some examples, the UE 115 may execute a set of codes to control the functional elements of the device to perform the functions described below. Additionally or alternatively, the UE 115 may perform aspects of the functions described below using special-purpose hardware.

At block 2205, the UE 115 may receive, in an unlicensed RF spectrum band, a channel reservation transmission indicating a transmission opportunity and an allocation of DL transmissions and UL transmissions as described above with reference to FIGS. 2 through 8. In certain examples, the operations of block 2205 may be performed by the channel reservation component as described with reference to FIGS. 14 and 15.

At block 2210, the UE 115 may determine CSI associated with the transmission opportunity as described above with reference to FIGS. 2 through 8. In certain examples, the operations of block 2210 may be performed by the CSI determining component as described with reference to FIGS. 14 and 15.

At block 2215, the UE 115 may transmit a CSI report in a channel reservation response transmission as described above with reference to FIGS. 2 through 8. In certain examples, the operations of block 2215 may be performed by the CSI reporting component as described with reference to FIGS. 14 and 15.

It should be noted that these methods describe possible implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for channel reservation techniques for unlicensed spectrum.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-A are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or CC associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNB, Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple subcarriers (e.g., waveform signals of different frequencies). Each modulated signal may be sent on a different subcarrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for channel reservation techniques for unlicensed spectrum. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a base station comprising:
    identifying a transmission opportunity duration for a transmission;
    determining an allocation between downlink (DL) transmissions and uplink (UL) transmissions for the identified transmission opportunity duration;
    broadcasting, in an unlicensed radio frequency (RF) spectrum band, a channel reservation transmission indicating the identified transmission opportunity duration and the determined allocation, wherein the channel reservation transmission comprises a channel state information (CSI) request; and
    receiving a channel reservation response transmission comprising an interference threshold indicator associated with a user equipment (UE) that indicates an amount of interference tolerable by the UE.

2. The method of claim 1, further comprising:
    receiving the channel reservation response transmission comprising a CSI report.

3. The method of claim 1, further comprising:
    receiving a CSI report before a DL transmission associated with the channel reservation transmission.

4. The method of claim 1, further comprising:
    determining, based at least in part on the received channel reservation response transmission, interference caused at the UE.

5. The method of claim 4, wherein:
    the channel reservation response transmission comprises a transmit (Tx) identifier (ID); and
    determining interference caused at the UE is based at least in part on the Tx ID.

6. The method of claim 1, further comprising:
    receiving a sounding reference signal (SRS); and
    scheduling UL transmissions based at least in part on the SRS.

7. The method of claim 6, further comprising:
    transmitting an SRS request in the channel reservation transmission, wherein the SRS is received before a DL transmission associated with the channel reservation transmission.

8. The method of claim 6, further comprising:
    transmitting an SRS request along with a DL grant for DL transmissions associated with the channel reservation transmission, wherein the SRS is received after DL transmissions associated with the DL grant.

9. The method of claim 1, further comprising:
    receiving a first CSI report associated with a first portion of the transmission opportunity duration;
    transmitting a first DL transmission during the first portion of the transmission opportunity duration based at least in part on the first CSI report;
    receiving a second CSI report associated with a second portion of the transmission opportunity duration; and
    transmitting a second DL transmission during the second portion of the transmission opportunity duration based at least in part on the second CSI report.

10. The method of claim 1, wherein:
    the channel reservation transmission has a field format of one or both of a Wi-Fi request to send (RTS) transmission and a Wi-Fi clear to send (CTS)-to-self transmission, and includes a receiver address (RA) field; and
    the identified transmission opportunity duration and the determined allocation are included in the RA field.

11. The method of claim 1, wherein:
    the channel reservation transmission comprises a physical downlink control channel (PDCCH) and one or both of a Wi-Fi request to send (RTS) transmission and a Wi-Fi clear to send (CTS)-to-self transmission; and
    the interference threshold indicator is carried by the PDCCH and one or both of the Wi-Fi RTS transmission and the Wi-Fi CTS-to-self transmission.

12. The method of claim 1, further comprising:
    detecting a channel reservation response transmission from a UE of a different operator; and
    determining a location of the UE of the different operator based at least in part on the detected channel reservation response transmission.

13. The method of claim 1, further comprising:
    detecting a channel reservation response transmission from one or both of a UE and a base station of a different operator; and
    refraining from transmitting during the identified transmission opportunity duration based at least in part on the detected channel reservation response transmission.

14. A method of wireless communication at a user equipment (UE) comprising:
    receiving, in an unlicensed radio frequency (RF) spectrum band, a channel reservation transmission indicating a transmission opportunity and an allocation of downlink (DL) transmissions and uplink (UL) transmissions, wherein the channel reservation transmission comprises a channel state information (CSI) request;
    determining CSI associated with the transmission opportunity; and
    transmitting a CSI report in a channel reservation response transmission, wherein the channel reservation response transmission comprises an interference threshold indicator associated with the UE that indicates an amount of interference tolerable by the UE.

15. The method of claim 14, wherein:
    the CSI report is transmitted in a physical uplink control channel (PUCCH) in the channel reservation response transmission, and a Wi-Fi clear-to-send (CTS) transmission carries the interference threshold indicator.

16. The method of claim 14, wherein:
    the CSI report is transmitted in a first physical uplink control channel (PUCCH) in the channel reservation response transmission; and
    the interference threshold indicator is transmitted in a second PUCCH in the channel reservation response transmission.

17. The method of claim 14, further comprising:
    transmitting a Wi-Fi clear to send (CTS) transmission in the channel reservation response transmission.

18. The method of claim 14, further comprising:
    transmitting the channel reservation response transmission across multiple sub-bands of a channel using a Wi-Fi waveform.

19. The method of claim 14, further comprising:
    detecting a second channel reservation response transmission from a wireless device of a different operator; and
    refraining from UL transmission during the transmission opportunity.

20. The method of claim 14, further comprising:
detecting a second channel reservation transmission from a base station of a different operator;
determining interference for the base station; and
refraining from transmitting during the transmission opportunity based at least in part on the determined interference.

21. The method of claim 14, further comprising:
reporting one or both of a demodulation reference signal (DMRS) and a beacon measurement for a base station of a different operator.

22. An apparatus for wireless communication, comprising:
a processor;
memory in electronic communication with the processor; and
instructions stored in the memory, the instructions being executable by the processor to:
identify a transmission opportunity duration for a transmission;
determine an allocation between downlink (DL) transmissions and uplink (UL) transmissions for the identified transmission opportunity duration;
broadcast, in an unlicensed radio frequency (RF) spectrum band, a channel reservation transmission indicating the identified transmission opportunity duration and the determined allocation, wherein the channel reservation transmission comprises a channel state information (CSI) request; and
receive a channel reservation response transmission comprising an interference threshold indicator associated with a user equipment (UE) that indicates an amount of interference tolerable by the UE.

23. The apparatus of claim 22, wherein the instructions are executable by the processor to:
receive, from the UE, the channel reservation response transmission comprising a CSI report.

24. The apparatus of claim 22, wherein the instructions are executable by the processor to:
receive a CSI report before a DL transmission associated with the channel reservation transmission.

25. The apparatus of claim 22, wherein the instructions are executable by the processor to:
determine interference caused at the UE based at least in part on the received channel reservation response transmission.

26. An apparatus for wireless communication, comprising:
a processor;
memory in electronic communication with the processor; and
instructions stored in the memory, the instructions being executable by the processor to:
receive, in an unlicensed radio frequency (RF) spectrum band, a channel reservation transmission indicating a transmission opportunity and an allocation of downlink (DL) transmissions and uplink (UL) transmissions, wherein the channel reservation transmission comprises a channel state information (CSI) request;
determine CSI associated with the transmission opportunity; and
transmit a CSI report in a channel reservation response transmission, wherein the channel reservation response transmission comprises an interference threshold indicator associated with a user equipment (UE) that indicates an amount of interference tolerable by the UE.

* * * * *